(12) United States Patent
Sako

(10) Patent No.: US 8,836,297 B2
(45) Date of Patent: Sep. 16, 2014

(54) SWITCHING DEVICE AND METHOD OF CONTROLLING SWITCHING DEVICE

(71) Applicant: Seiko Epson Corporation, Tokyo (JP)

(72) Inventor: Yasuhiko Sako, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 13/625,319

(22) Filed: Sep. 24, 2012

(65) Prior Publication Data

US 2013/0082673 A1     Apr. 4, 2013

(30) Foreign Application Priority Data

Sep. 22, 2011 (JP) ................................. 2011-206801

(51) Int. Cl.
*G05F 1/577* (2006.01)
*G05F 1/46* (2006.01)

(52) U.S. Cl.
USPC ............................ 323/267; 323/272; 323/282

(58) Field of Classification Search
USPC .......................... 323/267, 271, 272, 282–290
See application file for complete search history.

(56) References Cited

U.S. PATENT DOCUMENTS

| 7,782,029 B2 * | 8/2010 | Chapuis et al. ............... 323/267 |
| 7,851,940 B2 * | 12/2010 | Mahin et al. .................... 307/11 |
| 2008/0122291 A1 * | 5/2008 | Uchimoto et al. .............. 307/31 |
| 2011/0122662 A1 * | 5/2011 | Li et al. .......................... 363/49 |

FOREIGN PATENT DOCUMENTS

| JP | 05-083939 A | 4/1993 |
| JP | 2000-116127 A | 4/2000 |

* cited by examiner

*Primary Examiner* — Jessica Han
(74) *Attorney, Agent, or Firm* — Nutter McClennen & Fish LLP; John J. Penny, Jr.

(57) ABSTRACT

A switching device is disclosed in which electric current through a rectification circuit, depending on whether a main switching element turns on or off, and thus electric current from the rectification circuit flows through whichever of first and second sub-switching elements, turns on. By controlling the turning on and off of the first and second sub-switching elements, the switching is performed which determines through which of the first and second output circuits the electric current from the rectification circuit flows. Thus, a voltage that is a result of transforming a voltage from a DC power supply in response to the electric current flowing through the first output circuit, is output from a first output terminal, and a voltage that is a result of transforming a voltage from the DC power supply in response to the electric current flowing through the second output circuit, is output from a second output terminal.

14 Claims, 9 Drawing Sheets

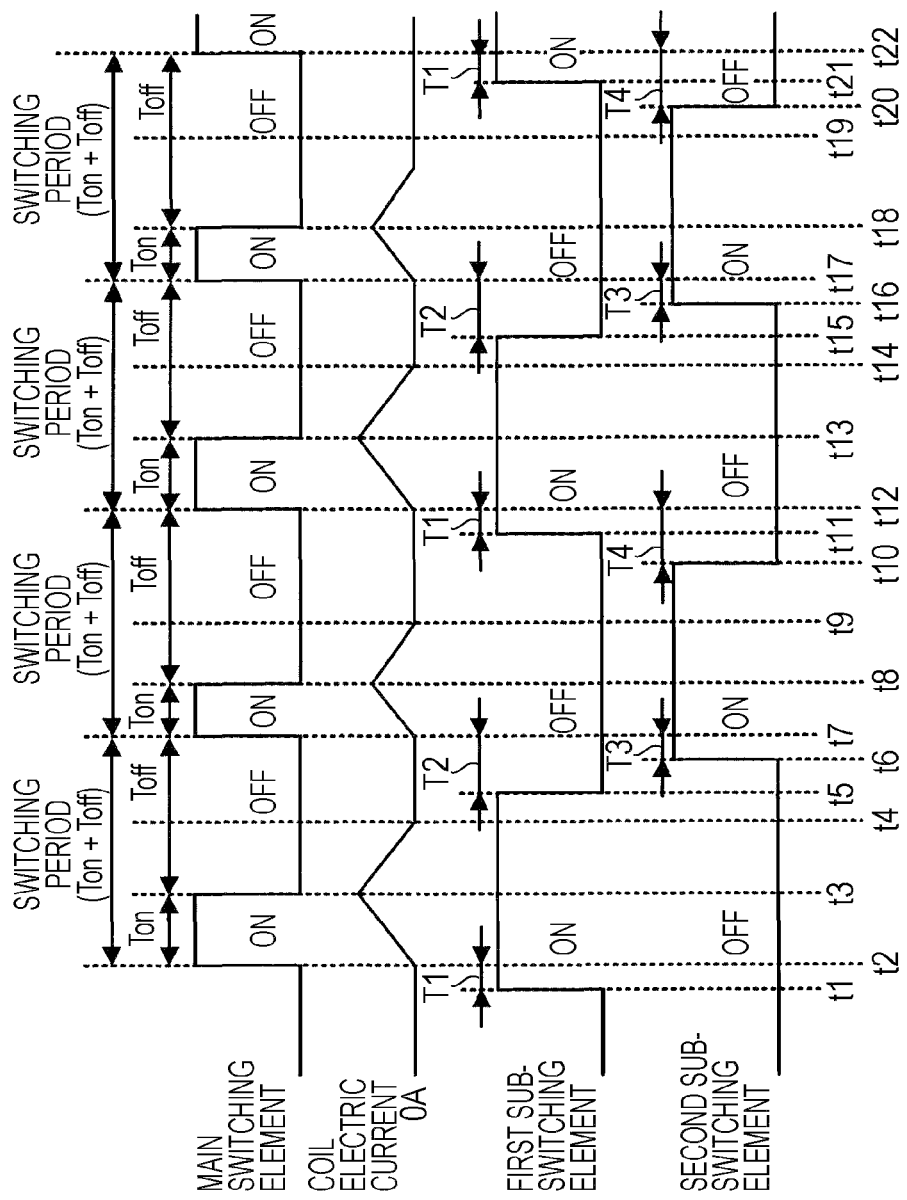

US 8,836,297 B2

SWITCHING DEVICE AND METHOD OF CONTROLLING SWITCHING DEVICE

INCORPORATED BY REFERENCE

The entire disclosure of Japanese Patent Application No. 2011-206801, filed Sep. 22, 2011 is expressly incorporated by reference herein.

BACKGROUND

1. Technical Field

The present invention relates to a switching device and a method of controlling a switching device.

2. Related Art

A DC-DC converter, which receives the input of a voltage from a DC power supply and outputs the voltage in a transformed form, has been known as a switching device. For example, a DC-DC converter is described in JP-A-05-83939, which includes a transistor, as a switching element, and a rectification circuit including a diode and a coil. The DC-DC converter steps down the voltage input from the DC power supply and outputs the voltage in the transformed form. Furthermore, a DC-DC converter is described in JPA-2000-116127, which receives an input of one voltage from the DC power supply and outputs plural voltages through being connected in parallel to a rectification circuit including a switching element and a coil.

In the circuit of an electronic device, in a case where plural voltages are required, which are transformed by the switching device. In this case, the switching devices have to be in numbers matching the required voltages. Therefore, the overall circuit which includes these switching devices increases in size. In particular, the coil, unlike a semiconductor, has not been reduced in size. Thus, when the switching devices have to be prepared in numbers matching the required voltages, because each of the switching devices has to include the coil, the overall circuit is difficult to reduce in size. Furthermore, the outputting of the plural voltages after receiving the input of one voltage from the DC power supply in one switching device is also described in JP-A-2000-116127, but, even in this switching device, coils are required in numbers matching the output terminals, and thus the overall circuit is difficult to reduce in size as well.

SUMMARY

An advantage of some aspects of the invention is to provide a switching device including fewer coils than output terminals, and a method of controlling a switching device.

According to an aspect of the invention, a switching device is provided which includes a main switching element capable of switching a voltage input from a DC power supply, a rectification circuit with a coil, connected to the main switching element, a first output circuit including a first sub-switching element performing switching between the rectification circuit and a first output terminal, with one end of the first output circuit being connected to the rectification circuit and the other end to the first output terminal, and a second output circuit including a second sub-switching element performing switching between the rectification circuit and a second output terminal, with one end of the second output circuit being connected to the rectification circuit and the other end to the second output terminal.

In the switching device of the aspect of the invention, electric current flows through the rectification circuit depending on the turning on and off of the main switching element, and the electric current from the rectification circuit flows through whichever of the first and second sub-switching elements turns on. Therefore, by controlling the turning on and off of the first and second sub-switching elements, the switching is performed which determines through which of the first and second output circuits the electric current from the rectification circuit flows. Thus, a voltage that is a result of transforming the voltage from the DC power supply in response to the electric current flowing through the first output circuit, is output from the first output terminal, and a voltage which is a result of transforming the voltage from the DC power supply in response to the electric current flowing through the second output circuit, is output from the second output terminal. Therefore, by sharing one rectification circuit, the switching device may be provided in which the number of coils is smaller than the number of output terminals. In this case, the rectification circuit may be a circuit including a diode that is connected to the coil in such a manner the direction the electric current flows is the forward direction, when the rectification circuit discharges electricity that the coil reserves. The first output circuit may further include a first capacitor smoothing a voltage output to the first output terminal, and the second output circuit may further include a second capacitor smoothing a voltage output to the second output terminal. With this configuration, the value of the voltage that is output from the output terminal may be stabilized. The switching device of the aspect of the invention may be one that can output the voltages to three or more of the output terminal, for example, by additionally including a third output circuit that includes a third sub-switching element performing the switching between the rectification circuit and a third output terminal, with one end of the third sub-switching element being connected to the rectification circuit, and the other end to the third output terminal, The switching device of the aspect of the invention may further include a control circuit that enables electric current to flow through the rectification circuit, depending on whether the main switching element turns on or off, by outputting a control signal to the main switching element and thus repeating the turning on and off of the main switching element, and performs the switching that determines through which of the first and second output circuits the electric current from the rectification circuit flows, in order to enable the first output terminal to output a voltage that is a result of transforming the voltage from the DC power supply in response to the electric current flowing through the first output circuit and in order to enable the second output terminal to output a voltage that is a result of transforming a voltage from the DC power supply in response to the electric current flowing through the second output circuit, by controlling the turning on and off of the first and second sub-switching elements. With this configuration, in the switching device, when the number of coils is smaller than the number of output terminals, since the turning on and off of the main switching element and the first and second sub-switching elements are controlled, the voltages output from the first and second output terminals may be controlled. Furthermore, the control circuit may control the turning on and off of the main switching element, and the first and second sub-switching elements, in such a manner to enable the first and second output terminals to respectively output different voltages.

Furthermore, in the switching device of the aspect of the invention, the control circuit may perform the switching of the first or second sub-switching element from an off-state to an on-state, during a specific period of time when the electric current from the rectification circuit does not flow into the corresponding sub-switching element although the sub-switching element turns on that is subject to the switching. With this configuration, when the sub-switching element is switched from the off-state to the on-state, the switching loss may be prevented from occurring.

In the switching device of the aspect of the invention, the control circuit may perform the switching of the first or second sub-switching element from the on-state to the off-state, during the specific period of time when the electric current from the rectification circuit does not flow into the corresponding sub-switching element although the sub-switching element turns on that is subject to the switching. With this configuration, when the sub-switching element is switched from the on-state to the off-state, the switching loss may be prevented from occurring.

In the switching device of the aspect of the invention, the control circuit may make each switching period correspond to the first or second output circuit, every switching period from the time when the main switching element is switched from the off-state to the on-state to the next time when the main switching element is switched from the off-state to the on-state. Then, the control circuit turns on only the sub-switching element of the output circuit corresponding to each switching period in the first and second sub-switching elements. As a result, the switching is performed in such a manner that the electric current from the rectification circuit flows through the output circuit corresponding to each switching period. With this configuration, the switching may be performed in a simple manner, which determines through which of the first and second output circuits the electric current from the rectification circuit flows.

In this case, in the switching device, by controlling the duty ratio of the turning on and off of the main switching element during the switching period, the control circuit may adjust the electric current flowing through the output circuit corresponding to each switching period, and thus may adjust the voltage output from the output terminal connected to the output circuit corresponding to each switching period. In this way, the simple control of the duty ratio of the turning on and off of the main switching element may adjust the voltage output from the output terminal. Furthermore, by changing the frequency of the switching period corresponding to the first output circuit, the control circuit may adjust the electric current flowing through the first output circuit, and thus may adjust the voltage output from the first output terminal. Also, by changing the frequency of the switching period corresponding to the second output circuit, the control circuit may adjust the electric current flowing through the second output circuit, and thus may adjust the voltage output from the second output terminal. In this way, a simple change in the frequency of the switching period corresponding to the output circuit may adjust the voltage output from the output terminal.

In the switching device of the aspect of the invention, which is capable of adjusting the voltage output from the output terminal described above, the control circuit may perform feedback control to adjust the voltages of the first and second output terminals in such a manner that the detected voltage of the first output terminal comes within a specific first voltage range, and the detected voltage of the second output terminal comes within a specific second voltage range. In this way, the voltage of the output terminal may be adjusted in a more appropriate manner. In a case of adjusting the voltage of the output terminal by controlling the duty ratio of the turning on and off of the main switching element, the feedback control may be performed in such a manner that the voltage of the output terminal comes within the specific voltage range. For example, when the detected voltage of the output terminal comes within a specific high voltage range, a ratio of on-time to a sum of on-time and off-time of the main switching element may be made smaller, that is, the duty ratio may be lowered. When the detected voltage of the output terminal comes within a specific low voltage range, the ratio of on-time to the sum of on-time and off-time of the main switching element may be made larger, that is, the duty ratio may be raised. In a case of adjusting the voltage of the output terminal by changing the frequency of the switching period corresponding to the output circuit, the feedback control may be performed in such a manner that the voltage of the output terminal comes within the specific voltage range. For example, when the detected voltage of the output terminal comes within the specific low voltage range, the frequency of the switching period corresponding to the output circuit connected to the output terminal may be increased. When the detected voltage of the output terminal comes within the specific high voltage range, the frequency of the switching period corresponding to the output circuit connected to the output terminal may be decreased.

In the switching element of the aspect of the invention, one end of the main switching element may be connected to the DC power supply and the other end to the rectification circuit. The rectification circuit may include a coil of which one end is connected to the main switching element and of which the other end is connected to the first and second output circuits, and a diode of which one end is connected to the main switching element and the coil and of which the other end is reference potential, with the forward direction being the direction in which the diode is directed from the other end toward the one end. Thus, each of the first and second output terminals may output the voltage that is the result of stepping down the voltage from the DC power supply. With this configuration, the switching device of the aspect of the invention may have the same function as the step-down converter which outputs a voltage that is a result of stepping down the voltage from the DC power supply, from the output terminal. In this case, the main switching element may be an NPN transistor in which the base is connected to the control circuit, an emitter to the DC power supply, and a collector to the rectification circuit, or may be an N-channel MOSFET in which a gate is connected to the control circuit, a drain to the DC power supply, and a source to the rectification circuit. With this configuration, a transistor or a MOSFET may be used as the switching element. Thus, the switching may be performed with relatively less driving current.

In the switching device of the aspect of the invention, the rectification circuit may include a coil of which one end is connected to the DC power supply and of which the other end is connected to the diode and the main switching element, and a diode of which one end is connected to the coil and the main switching element and of which the other end is connected to the first and second output circuits, with the forward direction being the direction in which the diode is directed from the one end toward the other end. One end of the main switching element may be connected to the coil and the diode and the other end may be the reference potential. Thus, each of the first and second output terminals may output the voltage that is the result of stepping up the voltage from the DC power supply. With this configuration, the switching device of the aspect of the invention may have the same function as the step-up converter which outputs the voltage that is the result of stepping up the voltage from the DC power supply, from the output terminal. In this case, the main switching element is an NPN transistor in which a base is connected to the control circuit, an emitter is connected to the rectification circuit, and a collector is the reference potential, or may be an N-channel MOSFET in which a gate is connected to the control circuit, a drain is connected to the rectification circuit, and a source is the reference potential. With this configuration, a transistor or a MOSFET may be used as the switching element. Thus, the switching may be performed with relatively less driving current. The reference potential may be ground potential.

According to another aspect of the invention, there is provided a method of controlling a switching device which includes a main switching element capable of switching a voltage input from a DC power supply, a rectification circuit with a coil, connected to the main switching element, a first output circuit including a first sub-switching element performing switching between the rectification circuit and a first output terminal, with one end of the first output circuit being connected to the rectification circuit and the other end to the first output terminal, and a second output circuit including a second sub-switching element performing switching between the rectification circuit and a second output terminal, with one end of the second output circuit being connected to the rectification circuit and the other end to the second output terminal. The method of controlling a switching device may include enabling electric current to flow through the rectification circuit, depending on whether the main switching element turns on and off, by outputting a control signal to the main switching element and thus repeating the turning on and off of the main switching element, and subsequently performing switching that determines through which of the first and second output circuits the electric current from the rectification circuit flows, in order to enable the first output terminal to output the voltage that is the result of transforming the voltage from the DC power supply in response to electric current flowing through the first output circuit and in order to enable the second output terminal to output the voltage that is the result of transforming the voltage from the DC power supply in response to the electric current flowing through the second output circuit, by controlling the turning on and off of the first and second sub-switching elements.

In the method of controlling a switching device of the aspect of the invention, as in the switching device described above, the number of coils may be smaller than the number of output terminals. In the method of controlling a switching device, this is done by sharing one rectification circuit. In this case, the voltages output from the first and second output terminals may be controlled because the turning on and off of the main switching element and the first and second sub-switching elements is controlled. In the method of controlling a switching device, the various embodiments of the switching device described above may be used. Furthermore, steps of performing the functions of the switching device described above may be included.

BRIEF DESCRIPTION OF THE DRAWINGS

The invention will be described with reference to the accompanying drawings, wherein like numbers reference like elements.

FIG. 2 is a timing chart illustrating an operation state of the switching device according to the first embodiment.

FIGS. 3A and 3B are explanatory views illustrating an operation state in which a first sub-switching element turns on.

FIGS. 4A and 4B are explanatory views illustrating an operation state in which a second sub-switching element turns on.

FIGS. 7A and 7B are explanatory views illustrating an operation state in which the first sub-switching element turns on.

FIG. 8 is an explanatory view illustrating an operation state in which the second sub-switching element turns on.

DESCRIPTION OF EXEMPLARY EMBODIMENTS

First Embodiment

Figure 1:
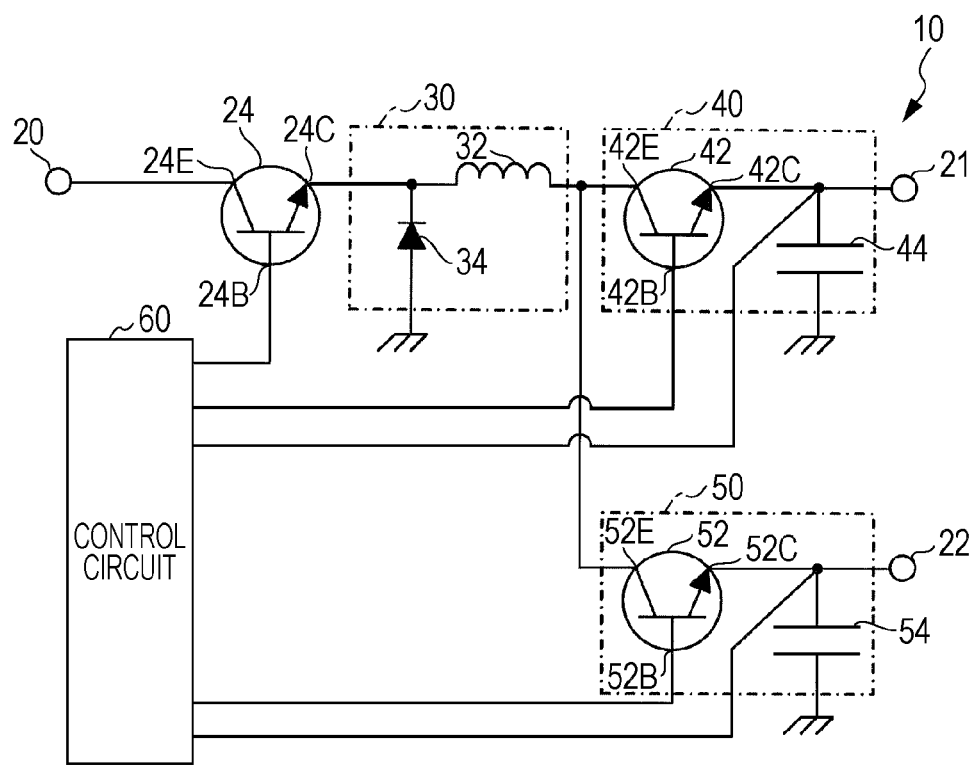
FIG. 1 is a configuration view illustrating a general configuration of a switching device according to a first embodiment.

FIG. 1 is a configuration view illustrating a general configuration of a switching device 10 according to a first embodiment. The switching device 10 according to the first embodiment is configured as a DC-DC converter that receives the input of a DC voltage and outputs the DC voltage in the transformed form, in an electronic apparatus such as a multi-function device and a printer. To do this, the switching device 10 includes an input terminal 20, a first output terminal 21, a second output terminal 22, a main switching element 24, a rectification circuit 30, a first output circuit 40, a second output circuit 50, and a control circuit 60. Furthermore, the switching device 10 is configured as a step-down converter that enables each of the first and second output terminals 21 and 22 to output the voltage that is the result of stepping down a voltage from a DC power supply.

The input terminal 20 is connected to the DC power supply (not shown) outputting a given voltage (for example, 42V). The input terminal 20 is a terminal which receives the input of electricity from the DC power supply. Furthermore, the DC power supply applies the given voltage to between the reference potential, as ground potential, and the input terminal 20. The first output terminal 21 is a terminal from which to output the voltage V1 (for example, 5V) that is the result of stepping down the voltage from the DC power supply. The second output terminal 22 is a terminal from which to output the voltage V2 (for example, 3.3V) that is the result of stepping down the voltage from the DC power supply. The first output terminal 21 is connected to, for example, a circuit that enables an LED, used in a CIS sensor of a scanner, to emit light, or is connected to a circuit that works at the voltage V1. The second output terminal 22 is a terminal from which to output the voltage V2 that is a result of stepping down the voltage from the DC power supply. The voltage V2 is different in value from the voltage V1. The second output terminal 22 is connected to, for example, a CPU, or memory, or is connected to a circuit that works at the voltage V2.

The main switching element 24 is an element that is capable of switching electricity input from the DC power supply via the input terminal 20. One end of the main switching element 24 is connected to the DC power supply and the other end to the rectification circuit 30. More specifically, the main switching element 24 is an NPN transistor, in which a base 24B is connected to the control circuit 60, an emitter 24E to the DC power supply, and a collector 24C to the rectification circuit. The main switching element 24 turns on, when the voltage from the control circuit 60 is applied to the base 24B, and thus the emitter 24E and the collector 24C are electrically connected to each other. As a result, the electricity from the input terminal 20 is output to the rectification circuit 30. On the other hand, when the voltage from the control circuit 60 is not applied to the base 24B, the main switching element 24 turns off. Thus, the electricity from the input terminal 20 is not output to the rectification circuit 30.

The rectification circuit 30 is a circuit that is connected to the main switching element 24. The rectification circuit 30 includes a coil 32 and a diode 34. One end of the coil 32 is connected to the collector 24C of the main switching element 24, and the other end to the first and second output circuits 40 and 50. Reactance L of the coil 32 is, for example, several tens μF, and may be 68 μF. The coil 32 as an element is large in size compared to semiconductor elements such as the main switching element 24 and the diode 34. One end of the diode 34 is connected to the collector 24C of the main switching element 24 and the coil 32, and the other end is the reference potential. The forward direction is the direction in which the diode 34 is directed from the other end toward the one end. In the rectification circuit 30, when the main switching element 24 turns on, the electric current from the DC power supply flows through the coil 32 via the main switching element 24. Thus, the electric current from the rectification circuit 30 flows through the first output circuit 40, or through the first sub-switching element 42, and at the same time the electricity is reserved in the coil 32. On the other hand, when the main switching element 24 turns off, since the diode 34 is connected, in such a manner that the direction in which electric current flows when the coil 32 discharges the reserved electricity is the forward direction, the reserved electricity of the coil 32 is discharged to the first or second output circuit 40 or 50.

The first output circuit 40 is a circuit of which one end is connected to the rectification circuit 30, and of which the other end is connected to the first output terminal 21. The first output circuit 40 includes the first sub-switching element 42 and a first capacitor 44. The first sub-switching element 42 is an NPN transistor, in which a base 42B is connected to the control circuit 60, an emitter 42E to the other end of the coil 32 of the rectification circuit 30, and a collector 42C to the first output terminal 21 and the first capacitor 44. The first sub-switching element 42 performs switching between the rectification circuit 30 and the first output terminal 21. One end of the first capacitor 44 is connected to the collector 42C of the first sub-switching element 42 and the first output terminal 21, and the other end to the reference potential. Thus, that voltage that is output to the first output terminal 21 is smoothed. Electrostatic capacity C of the first capacitor 44 may range, for example, from several tens of μF to several hundreds of μF, and may be 100 μF or 220 μF. In the first output circuit 40, when the voltage from the control circuit 60 is applied to the base 42B, the first sub-switching element 42 turns on. Thus, the emitter 42E and the collector 42C are electrically connected to each other, resulting in electricity from the rectification circuit 30 being output to the first output terminal 21. On the other hand, when the voltage from the control circuit 60 is not applied to the base 42B, the first sub-switching element 42 turns off. Thus, electricity from the rectification circuit 30 is not output to the first output terminal 21.

The second output circuit 50 is a circuit of which one end is connected to the rectification circuit 30, and of which the other end is connected to the second output terminal 22. The second output circuit 50 includes a second sub-switching element 52 and a second capacitor 54. The second sub-switching element 52 is an NPN transistor, in which a base 52B is connected to the control circuit 60, an emitter 52E to the other end of the coil 32 of the rectification circuit 30, and a collector 52C to the second output terminal 22 and the second capacitor 54. The second sub-switching element 52 performs switching between the rectification circuit 30 and the second output terminal 22. One end of the second capacitor 54 is connected to the collector 52C of the second sub-switching element 52 and the second output terminal 22, and the other end to the reference potential. Thus, the voltage that is output to the second output terminal 22 is smoothed. Electrostatic capacity C of the second capacitor 54 may range, for example, from several ten μF to several hundreds μF, and may be 100 pF, or 220 μF. In the second output circuit 50, when the voltage from the control circuit 60 is applied to the base 52B, the second sub-switching element 52 turns on. Thus, the emitter 52E and the collector 52C are electrically connected to each other, resulting in electricity from the rectification circuit 30 being output to the second output terminal 22. On the other hand, when the voltage from the control circuit 60 is not applied to the base 52B, the second sub-switching element 52 turns off. Thus, electricity from the rectification circuit 30 is not output to the second output terminal 22.

The control circuit 60 is configured as an ASIC (Application Specific Integrated Circuit) that controls the switching of the main switching element 24, the first sub-switching element 42 and the second sub-switching element 52. The control circuit 60 is connected to the base 24B of the main switching element 24, the base 42B of the first sub-switching element 42, and the base 52B of the second sub-switching element 52, and outputs a control signal to each of the bases 24B, 42B, and 52B. Furthermore, the control circuit 60 is connected to a connecting point between the first sub-switching element 42 and the first capacitor 44, and detects the voltage of this connecting point as the voltage V1 of the first output terminal 21. Also, the control circuit 60 is connected to a connecting point between the second sub-switching element 52 and the second capacitor 54, and detects a voltage of this connecting point as the voltage V2 of the second output terminal 22. The control circuit 60 outputs the control signal to the main switching element 24 and turns on and off the main switching element 24, in a repetitive manner. Thus, the electric current flows through the rectification circuit 30 depending on whether the main switching element 24 turns on or off. The control circuit 60 controls the turning on and off of the first and second sub-switching elements 42 and 52, and thus the switching is performed which determines through which of the first and second output circuits 40 and 50 the electric current from the rectification circuit 30 flows. As a result, the control circuit 60 has a function of enabling the first output terminal 21 to output the voltage that is the result of transforming the voltage from the DC power supply in response to the electric current flowing through the first output circuit 40, and of enabling the second output terminal 22 to output the voltage that is the result of transforming the voltage from the DC power supply in response to the electric current flowing through the second output circuit 50. Furthermore, the control circuit 60 has a function of performing the feedback control to adjust the voltage V1 of the first output terminal 21 and the voltage V2 of the second output terminal 22, the detected voltage V1 of the first output terminal 21 may come within a first voltage range (for example, a range of 5V±5%) that is set as a target value, and the detected voltage V2 of the second output terminal 22 may come within a second voltage range (for example, a range of 3.3V±5%) that is set as a target value.

Figure 3A:
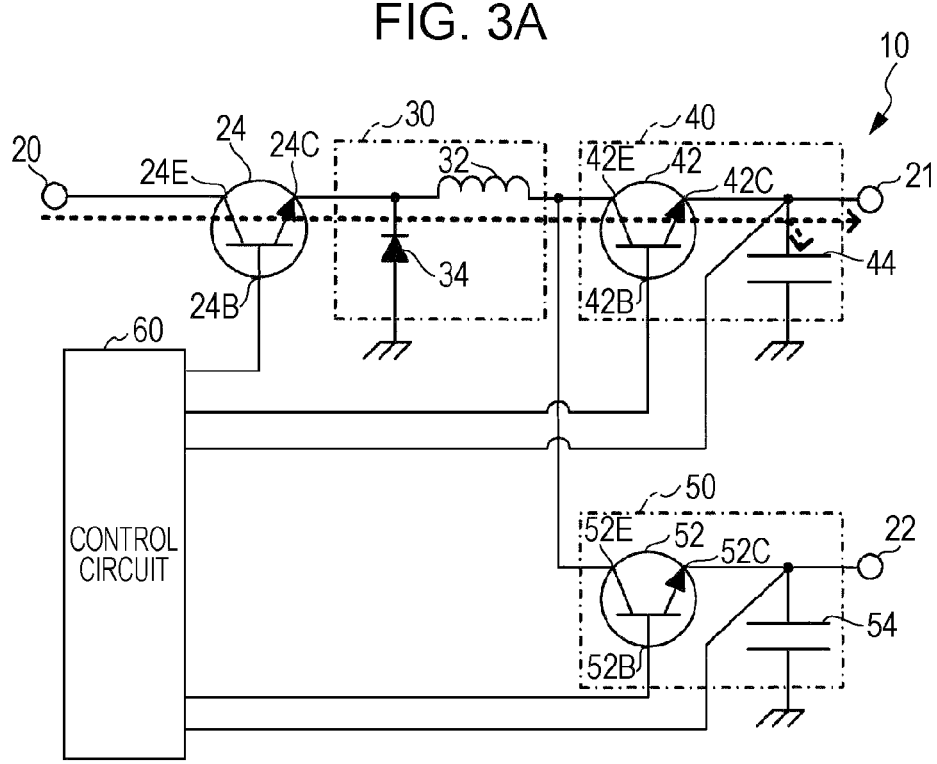
Figure 3B:
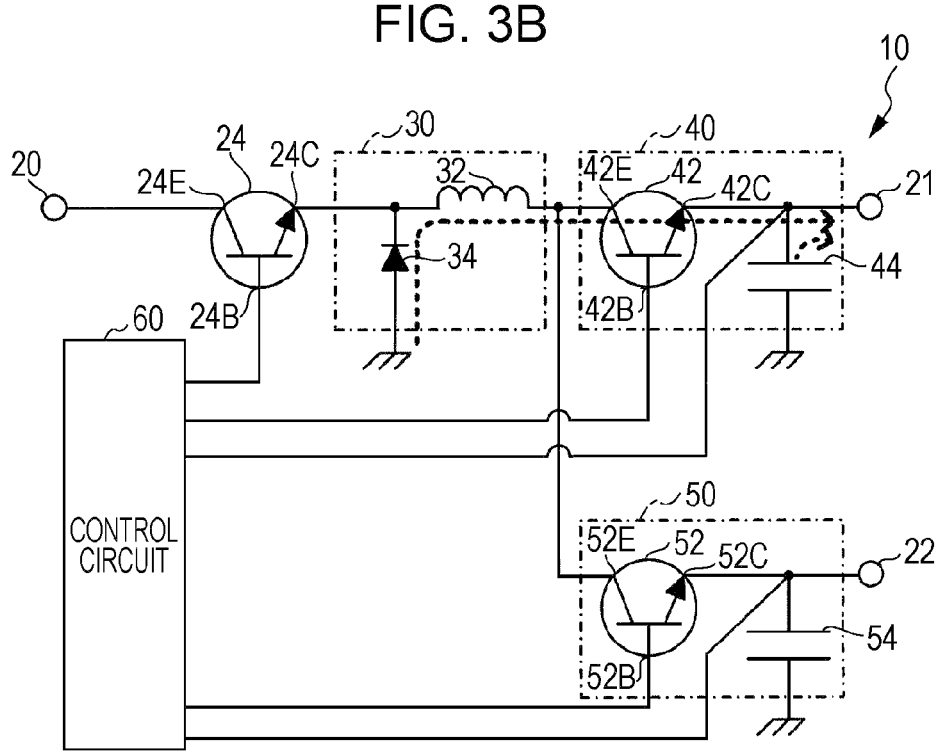
Figure 4A:
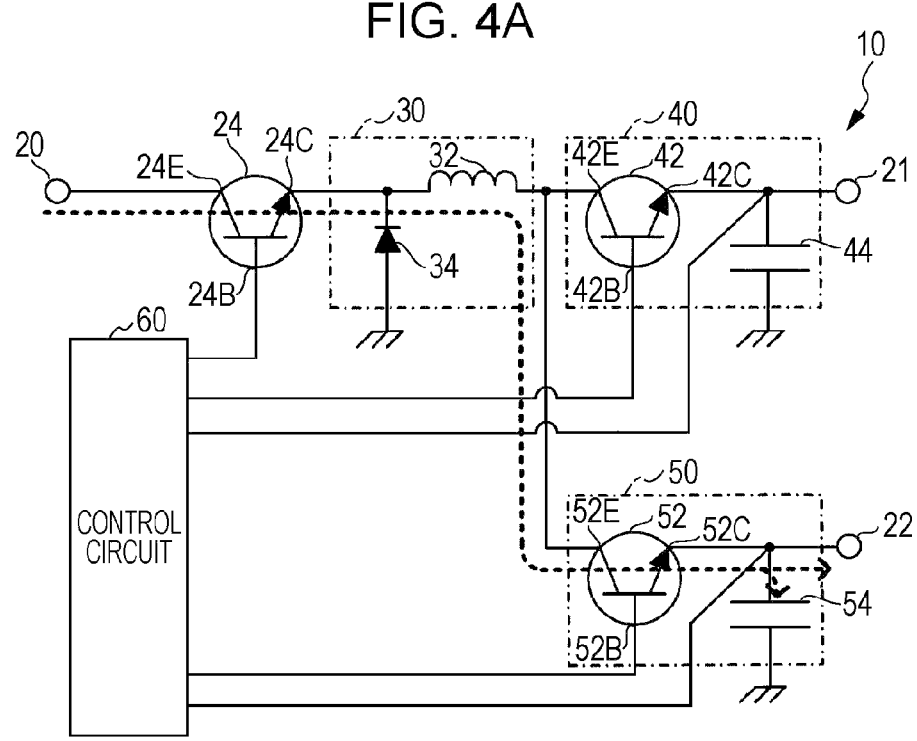
Figure 4B:
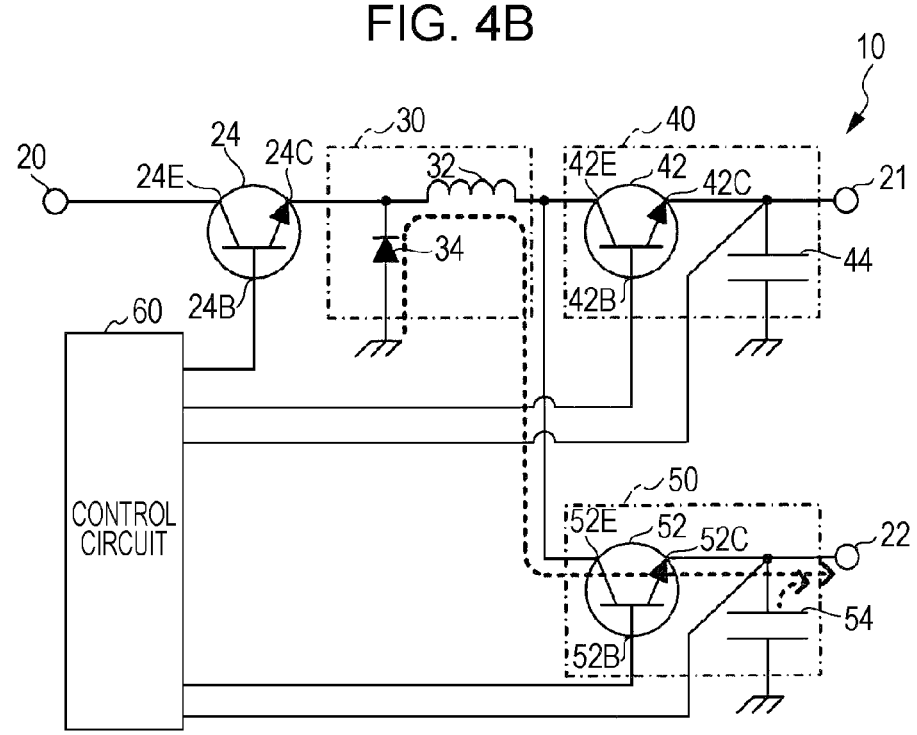

Next, the operation of the switching device 10 with this configuration according to the first embodiment is now described. FIG. 2 is a timing diagram illustrating an operation state of the switching device 10. FIGS. 3A and 3B are explanatory views illustrating an operation state in which the first sub-switching element 42 turns on. FIG. 3A is an explanatory view illustrating an operation state in which both of the main switching element 24 and the first sub-switching element 42 turn on. FIG. 3B is an explanatory view illustrating an operation state in which the main switching element 24 turns off, and the first sub-switching element 42 turn on. FIGS. 4A and 4B are explanatory views illustrating an operation state in which the second sub-switching element 52 turns on. FIG. 4A is an explanatory view illustrating an operation state in which both of the main switching element 24 and the second sub-switching element 52 turn on. FIG. 4B is an explanatory view illustrating an operation state in which the main switching element 24 turns off and the second sub-switching element 52 turns on.

First, the general control of the main switching element 24, the first sub-switching element 42, and the second sub-switching element 52 by the control circuit 60 is described. The control circuit 60 outputs a pulse signal with a given frequency f (for example, 100 kHz), as the control signal, to the base 24B. Thus, the main switching element 24 turns on and off, in a repetitive manner, as shown in FIG. 2. Furthermore, the control circuit 60 fixes as a frequency T (=1/f) a length of on-time Ton and off-time Toff which is a sum of on-time Ton and off-time Toff of the switching element 24, and changes on-time Ton of the main switching element 24. Thus, the duty ratio, which is a ratio of on-time Ton to a sum of on-time Ton and off-time Toff, is made to change. Furthermore, that period, expressed as a sum of on-time Ton and off-time Toff, is defined as a switching period. That is, the switching means the period which ranges from the time when the main switching element 24 is switched from an off-state to an on-state to the next time when the main switching element 24 is switched from the off-state to the on-state. Each switching period corresponds to either of the first and second output circuits 40 and 50. In the first embodiment, an initial switching period (the period from time t2 to time t7 in FIG. 2) corresponds to the first output circuit 40, the second switching period (the period from time t7 to time t12 in FIG. 2) corresponds to the second output circuit 50, and each of subsequent switching periods corresponds to the first and second output circuits 40 and 50, in an alternating manner. In addition, the control circuit 60 turns on only the sub-switching element that corresponds to the switching period in the first and second sub-switching elements 42 and 52. Thus, the control circuit 60 performs switching in such a manner to enable the electric current from the rectification circuit 30 to flow through the output circuit corresponding to the switching period.

Next, a specific operation state of the switching device 10 according to a time series in FIG. 2, is described. First of all, the control circuit 60 turns on the first sub-switching element 42 of the first output circuit 40 during the initial switching period that corresponds to the first output circuit 40. More specifically, since the main switching element 24, and the first and second sub switching elements 42 and 52 are in an off-state, the control circuit 60 turns on the first sub-switching element 42 of the first output circuit 40 at time t1. Subsequently, the main switching element 24 turns on at time t2. Because of this, at time t2, both of the main switching element 24 and the first sub-switching element 42 are in the on-state, and thus the second sub-switching element 52 turns off. As a result, as shown in FIG. 3A, the electric current from the DC power supply flows through the input terminal 20, the main switching element 24, the rectification circuit 30, the first output circuit 40, and the first output terminal 21, in this order. Therefore, the voltage in response to this electric current is output to the first output terminal 21, and at the same time the electric current flows into even the first capacitor 44, resulting in electric charge being reserved.

At this point, time t1 is earlier by time T1 (T1 is a positive value) only than time t2 when the main switching element 24 turns on. This time T1 is a value that is determined in advance, in such a manner that the switching of the first sub-switching element 42 from the off-state to an on-state is performed during the period of time when the electric current from the rectification circuit 30 does not flow into the first sub-switching element 42 although the first sub-switching element 42 turns on that is subject to the switching. For example, since the main switching element 24 turns on at time t2, the electric current from the rectification circuit 30 (the coil 32) flows into the first sub-switching element 42 at the moment the first sub-switching element 42 turns on, when the first sub-switching element 42 turns on after time t2. Because of this, the switching loss occurs in the first sub-switching element 42. Therefore, when the first sub-switching element 42 turns on earlier than time t2 by time T1 only, this switching loss may be prevented from occurring. Time T1 may be determined by experiment, based on, for example, the time when the first sub-switching element 42 turns on, in such a manner that the first sub-switching element 42 is in the on-state before time t2.

Next, the control circuit 60 turns off the main switching element 24 at time t3 when on-time Ton elapses from time t2. For this reason, during the period between time t2 and time t3, the main switching element 24 and the first sub-switching element 42 turn on. Because of this, during the period between t2 and time t3, the amount of electric current gradually increases that flows through the coil 32. Furthermore, the voltage in response to the electric current flowing through the coil 32 is output to the first output terminal 21, and at the same time the electric current flows into even the first capacitor 44, resulting in electric charge being reserved.

At time t3, when the control circuit 60 turns off the main switching element 24, the main switching element 24 and the second sub-switching element 52 turn off, and at the same time the first sub-switching element 42 turns on, as shown in FIG. 3B. In this state, since the main switching element 24 turns off, the electric current from the input terminal 20 does not flow into the rectification circuit 30. Therefore, since the coil 32 discharges the electric energy to keep the electric current flowing, the electric current from the reference potential flows into the diode 34, the coil 32, the first output circuit 40, and the first output terminal 21, in this order, as shown in FIG. 3B. Furthermore, electric charge is also discharged from the first capacitor 44, and thus the electric current flows through the first output terminal 21. Therefore, voltage in response to this electric current is output to the first output terminal 21. At this point, since the coil 32 discharges the electric energy, the amount of electric current flowing through the coil 32 from time t3 gradually decreases and becomes zero at time t4, as shown in FIG. 2. For this reason, after time t4, the electric current flowing through the coil 32 as shown in FIG. 3B is not present, and only the electric current from the first capacitor 44 flows through the first output terminal 21. Furthermore, since even the amount of electric current from the first capacitor 44 gradually decreases, the amount of electric current from the first output terminal 21 gradually decreases during the period from time t3 to the next time t12 when both of the main switching element 24 and the first sub-switching element 42 turn on.

Next, at time t5, the control circuit 60 turns off the first sub-switching element 42. At this point, time t5 is earlier by time T2 (T2 is a positive value) only than time t7, that is, the next time when the main switching element 24 turns on. This time T2 is a value that is determined in advance, in such a manner that the switching of the first sub-switching element 42 from the on-state to the off-state is performed during the period of time when the electric current from the rectification circuit 30 does not flow into the first sub-switching element 42 although the first sub-switching element 42 turns on that is subject to the switching. As described above, since the electric current does not flow through the coil 32 after time t4, the electric current from the rectification circuit 30 does not flow into the first sub-switching element 42, during the period from time t4 to time t7 until the next time when the main switching element 24 turns on, although the first sub-switching element 42 turns on. Therefore, time T2 is determined in such a manner to turn off the first sub-switching element 42 during this period from time t4 to time t7. In this manner, the switching loss becomes zero when the first sub-switching element 42 turns off. Time T2 may be determined in such a manner that time t5 comes after time t4, for example, by determining the period from time t3 to time t4 by experiment in advance. Furthermore, Time T2 may be determined, based on, for example, the time when the first sub-switching element 42 turns off, in such a manner that the first sub-switching element 42 turns off before time t7.

Next, the control circuit 60 turns on the second sub-switching element 52 of the second output circuit 50 during the next switching period (from time t7 to time t12) corresponding to the second output circuit 50. More specifically, the second sub-switching element 52 of the second output circuit 50 turns on at time t6, and the main switching element 24 turns on at time t7 when off-time Toff elapses from time t3. Because of this, at time t7, both of the main switching element 24 and the second sub-switching element 52 turn on and thus the first sub-switching element 42 turns off. As a result, as shown in FIG. 4A, the electric current from the DC power supply flows into the input terminal 20, the main switching element 24, the rectification circuit 30, the second output circuit 50, and the second output terminal 22, in this order. Therefore, the voltage in response to this electric current is output to the second output terminal 22, and at the same time the electric current flows into even the second capacitor 54, resulting in electric charge being reserved.

At this point, time t6 is earlier than time 7t by time T3 (T3 is a positive value) when the main switching element 24 turns on. This time T3 is a value that is determined in advance, in such a manner that the switching of the second sub-switching element 52 from the off-state to the on-state is performed during the period of time when the electric current from the rectification circuit 30 does not flow into the second sub-switching element 52 although the second sub-switching element 52 turns on that is subject to the switching. Because of this, at time t1, the switching loss is prevented from occurring when the second sub-switching element 52 turns on, as well as when the first sub-switching element 42 turns on. In the first embodiment, time T3 is the same value as the time T1. Therefore, time T3 is set to a value less than time T2 to prevent this order of time t5 and time t6 from being reversed, that is, to turn on the second sub-switching element 52 after the first sub-switching element 42 turns off.

Subsequently, the control circuit 60 turns off the main switching element 24 at time t8 when on-time Ton elapses from time t7. For this reason, during the period from time t7 to time t8, the main switching element 24 and the second sub-switching element 52 turn on. Because of this, during the period from time t7 to time t8, the amount of electric current flowing through the coil 32 gradually increases. Furthermore, the voltage in response to the electric current flowing through the coil 32 is output to the second output terminal 22, and at the same time the electric current flows into even the second capacitor 54, resulting in electric charge being reserved.

At time t8, when the control circuit 60 turns off the main switching element 24, the main switching element 24 and the first sub-switching element 42 turn off, and at the same time the second sub-switching element 52 turns on, as shown in FIG. 4B. In this state, since the main switching element 24 turns off, the electric current from the input terminal 20 does not flow into the rectification circuit 30. Therefore, since the coil 32 discharges the electric energy to keep the electric current flowing, the electric current from the reference potential flows into the diode 34, the coil 32, the second output circuit 50, and the second output terminal 22, in this order, as shown in FIG. 4B. Furthermore, electric charge is also discharged from the second capacitor 54, and thus the electric current flows through the second output terminal 22. Therefore, the voltage in response to this electric current is output to the second output terminal 22. At this point, since the coil 32 discharges the electric energy, the amount of electric current, flowing through the coil 32 from time t8, gradually decreases, and becomes zero at time t9, as shown in FIG. 2. For this reason, after time t9, the electric current flowing through the coil 32 shown in FIG. 4B is not present, and only electric current from the second capacitor 54 flows through the second output terminal 22. Furthermore, since the amount of electric current from the second capacitor 54 also gradually decreases, the amount of electric current from the second output terminal 22 gradually decreases during the period from time t8 to the next time t17 when both of the main switching element 24 and the second sub-switching element 52 turn on.

Subsequently, the control circuit 60 turns off the second sub-switching element 52 at time t10. At this point, time t10 than time t12 is earlier by time T4 (T4 is a positive value) when the main switching element 24 turns on. This time T4 is a value that is determined in advance, in such a manner that the switching of the second sub-switching element 52 from the on-state to the off-state is performed during the period of time when the electric current from the rectification circuit 30 does not flow into the second sub-switching element 52 although the second sub-switching element 52 turns on that is subject to the switching. As described above, since the electric current does not flow through the coil 32 after time t9, the electric current from the rectification circuit 30 does not flow into the second sub-switching element 52, during the period from time t9 to time t12 until the next time when the main switching element 24 turns on, although the second sub-switching element 52 turns on. Therefore, time T4 is determined in such a manner to turn off the second sub-switching element 52 during this period between time t9 and time t12. In this manner, the switching loss becomes zero when the second sub-switching element 52 turns off. Time T4 may be determined in such a manner that time t10 comes after time t9 by determining the period from time t8 to time t9, for example, by experiment in advance. In the first embodiment, time T4 is the same value as time T2.

Next, the control circuit 60 turns on the first sub-switching element 42 of the first output circuit 40 during the next switching period (from time t12 to time t17) corresponding to the first output circuit 40. More specifically, the first sub-switching element 42 of the first output circuit 40 turns on at time t11, and the main switching element 24 turns on at time t12. Because of this, the state at time t7 is the same as that at time t2. Furthermore, time t11, like time t1, is earlier by time T1 only than time t12 when the main switching element 24 turns on. Furthermore, time T1 is set to a value less than time T4 to prevent the order of time t10 and time t11 from being reversed, that is, to turn on the first sub-switching element 42 after the second sub-switching element 52 turns off.

For the subsequent switching periods, the control circuit 60 performs the same operation as described above, according to the sub-switching element which corresponds to the switching period. For example, since the switching period from time t12 to time t17 corresponds to the first sub-switching element 42, the control circuit 60 controls the turning on and off of the main switching element 24, and the first and second sub-switching elements 42 and 52 during the period from time t11 to time t17 as it does during the period from time t1 to time t7. Furthermore, since the switching period from time t17 to time t22 corresponds to the second sub-switching element 52, the control circuit 60 controls the turning on and off of the main switching element 24, and the first and second sub-switching elements 42 and 52 during the period from time t16 to time t22 as it does during the period from time t6 to time t12.

Variation ranges of voltages V1 and V2 will now be described. During the periods from time t2 to time t3 and from time t12 to time t13, since the amount of electric current flowing through the first output terminal 21 gradually increases, the voltage V1 in response to this increases. During the periods from time t3 to time t12 and from time t13 to time t22, since the amount of electric current flowing through the first output terminal 21 gradually decreases, the voltage V1 in response to this decreases. Furthermore, during the period from time t7 to time t8 and the period from time t17 to time t18, since the amount of electric current flowing through the second output terminal 22 gradually increases, the voltage V2 in response to this increases. During the periods from time t8 to time t17 and from time t18 to the next time when both of the main switching element 24 and the second sub-switching element 52 turns on, since the electric current flowing through the second output terminal 22 gradually decreases, the voltage V2 in response to this decreases. In this way, the voltages V1 and V2 increases and decreases in a repetitive manner. The control circuit 60 performs the feedback control to adjust the duty ratio as described above, and thus the variation ranges of the voltages V1 and V2 that increase and decrease in a repetitive manner come within the first and second voltage ranges, respectively. For example, the control circuit 60 detects the voltage V1 of the first output terminal 21 in a specific timing before time t2. The control circuit 60 fixes the length of on-time Ton of the main switching element 24 from time t2 to time t3, that is, the duty ratio, by the feedback control so that the detected voltage V1 may come within the first voltage range. More specifically, when the detected voltage V1 comes within a specific high voltage range, on-time Ton is shortened, thereby lowering the duty ratio. In contrast, when the detected voltage V1 comes within a specific low voltage range, on-time Ton of the main switching element 24 is lengthened, thereby raising the duty ratio. At this point, the specific high voltage range may be, for example, a range equal to or more than a threshold value that is preset to a range from equal to or more than 5V to equal to or less than 5V+5%, in the first voltage range. Furthermore, the specific low voltage range may be, for example, a range equal to or less than a threshold value that is preset to ranging from equal to or more than 5V−5% to equal to or less than 5V, in the first voltage range. The voltage V2, like the voltage V1, is controlled by the feedback control. For example, the control circuit 60 detects the voltage V2 of the second output terminal 22 in a specific timing before time t7. The control circuit 60 fixes the length of on-time Ton from time t7 to time t8, that is, the duty ratio, by the feedback control, so that the detected voltage V2 may come within the second voltage range.

In this way, in the switching device 10 according to the first embodiment, the control circuit 60 controls the main switching element 24, and the first and second sub-switching elements 42 and 52, and thus the voltages V1 and V2 output from the first and second output terminals 21 and 22, respectively, are made different in value from each other, with the coil 32 of the rectification circuit 30 being shared between the first and second output terminals 21 and 22.

In the switching device 10 according to the first embodiment, as described above, the electric current flows through the rectification circuit 30, depending on whether the main switching element 24 turns on or off, and thus the electric current from the rectification circuit 30 flows through either of the first and second sub-switching elements 42 and 52, whichever turns on. Therefore, by controlling the turning on and off of the first and second sub-switching elements 42 and 52, the switching is performed which determines through which of the first and second output circuits 40 and 50 the electric current from the rectification circuit flows. Thus, the voltage that is a result of transforming the voltage from the DC power supply in response to the electric current flowing through the first output circuit 40, is output from the first output terminal 21, and the voltage that is a result of transforming the voltage from the DC power supply in response to the electric current flowing through the second output circuit 50, is output from the second output terminal 22. As a result, since one rectification circuit 30 is shared, the number of coils may be smaller than the number of output terminals. The coil 32 as an element is large in size compared to a semiconductor elements such as the main switching element 24 and the diode 34, but is smaller in number than the output terminals. Therefore, the overall switching device 10 may be reduced in size.

Furthermore, in the switching device 10, at the time when the number of coils is smaller than the number of output terminals, the control circuit 60 controls the turning on and off of the main switching element 24, and the first and second sub-switching elements 42 and 52, and thus the voltages output from the first and second output terminals 21 and 22 may be controlled.

Furthermore, the control circuit 60 performs the switching of the first and second sub switching elements 42 and 52 from the off-state to the on-state and the switching of the first and second sub switching elements 42 and 52 from the on-state to the off-state, during the specific period of time when electric current from the rectification circuit does not flow into the switching element although the sub switching element turns on that is subject to the switching. For this reason, when the switching of the first and second sub-switching elements 42 and 52 is performed, the switching loss may be prevented from occurring. Furthermore, the first and second sub-switching elements 42 and 52 may consume less electric power.

Furthermore, the control circuit 60 makes each switching period correspond to the first or second output circuit 40 or 50, every switching period from the time when the main switching element 24 is switched from the off-state to the on-state to the next time when the main switching element 24 is switched from the off-state to the on-state. Then, the control circuit 60 turns on only the sub-switching element of the first or second output circuit 40 or 50 corresponding to each switching period in the first and second sub-switching elements 42 and 44. As a result, the switching is performed in such a manner that the electric current from the rectification circuit 30 flows through the first or second output circuit 40 or 50 corresponding to each switching period. For this reason, the switching may be performed in a simple manner, which determines through which of the first and second output circuits 40 and 50 the electric current from the rectification circuit 30 flows.

By controlling the duty ratio of the turning on and off of the main switching element 24 during the switching period, the control circuit 60 adjusts the electric current flowing through the first or second output circuit 40 or 50 corresponding to each switching period, and adjusts the voltage output from the first or second output terminal 21 or 22 connected to the first or second output circuit 40 or 50 corresponding to each switching period, respectively. For this reason, the voltages V1 and V2, which are output from the first and second output terminals 21 and 22, respectively, may be adjusted by performing a simple function of controlling the duty ratio of the turning on and off of the main switching element 24.

Furthermore, the control circuit 60 performs the feedback control to adjust the voltages V1 and V2 of the first and second output terminal 21 and 22, respectively, by controlling the duty ratio of the turning on and off of the main switching element 24, in such a manner that the detected voltage V1 of the first output terminal 21 comes within the specific first voltage range, and the detected voltage V2 of the second output terminal 22 may come within the specific second voltage range. For this reason, the voltages V1 and V2 of the first and second output terminals 21 and 22 may be adjusted, respectively, in a more appropriate manner.

Second Embodiment

Figure 5:
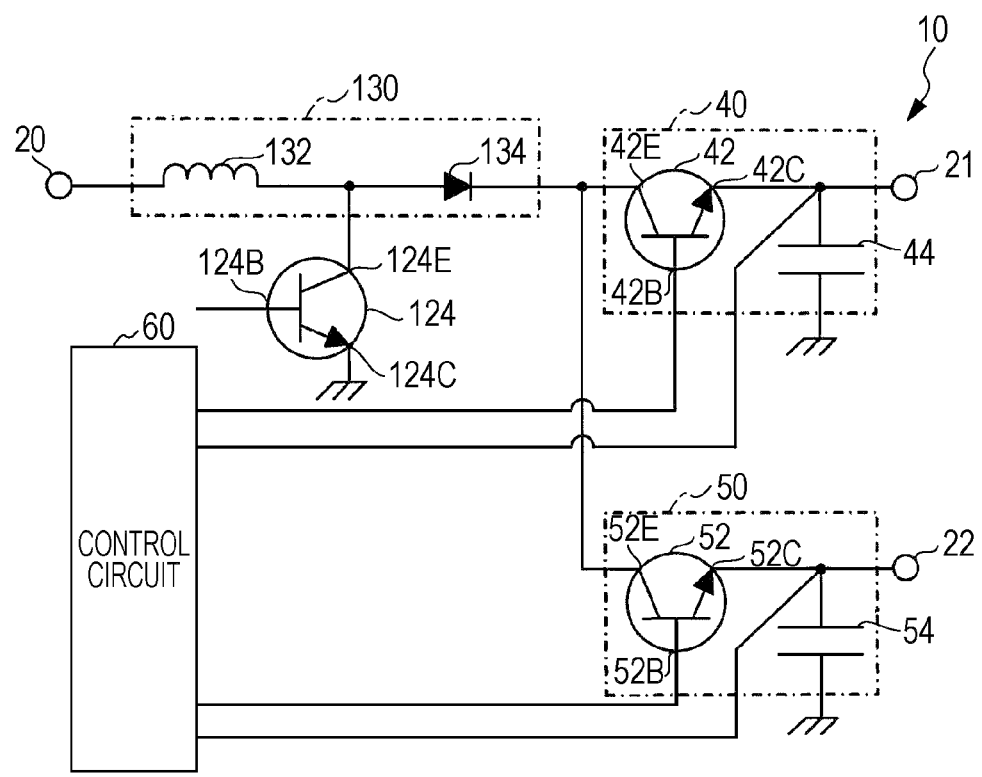
FIG. 5 is a configuration view illustrating a general configuration of a switching device according to a second embodiment.

FIG. 5 is a configuration view illustrating a general configuration of a switching device 110 according to a second embodiment. Furthermore, in the switching device 110 according to the second embodiment, the same elements as those of the switching device 10 are given like reference numerals and are not described.

The switching device 110 according to the second embodiment includes an input terminal 20, first and second output terminals 21 and 22, a main switching element 124, a rectification circuit 130, first and second output circuits 40 and 50, and a control circuit 60. The switching device 110 is configured as a step-up converter that enables each of the first and second output terminals 21 and 22 to output the voltage that is the result of stepping down the voltage from the DC power supply.

The input terminal 20 is connected to a DC power supply (not shown) outputting a given voltage (for example, 20V). The input terminal 20 is a terminal which receives the input of electricity from the DC power supply. The first output terminal 21 is a terminal from which to output the voltage V3 (for example, 30V) that is the result of stepping up the voltage from the DC power supply, connected to the input terminal 20. The second output terminal 22 is a terminal from which to output the voltage V4 (for example, 25V) that is the result of stepping up the voltage from the DC power supply, connected to the input terminal 20.

The main switching element 124 is an element that is capable of switching electricity input from the DC power supply via the input terminal 20. One end of the main switching element 124 is connected to a coil 132 of a rectification circuit 130 and a diode 134, and the other end becomes the reference potential. More specifically, the main switching element 124 is an NPN transistor, in which a base 124B is connected to the control circuit 60, an emitter 124E to the coil 132 of the rectification circuit 130 and a diode 134, and a collector 124C is the reference potential. The main switching element 124 turns on, when the voltage from the control circuit 60 is applied to the base 124B, and thus the emitter 124E and the collector 124C are electrically connected to each other. As a result, electricity input through the input terminal 20 and the coil 132 is output to the reference potential. On the other hand, when the voltage from the control circuit 60 is not applied to the base 124B, resulting in the off-state, the electricity from the input terminal 20 and coil 132 is not output to the reference potential.

The rectification circuit 130 is connected to the input terminal 20, the main switching element 124, and the first and second output circuits 40 and 50. The rectification circuit 130 includes the coil 132 and the diode 134. One end of the coil 132 is connected to the input terminal 20, and the other end to the diode 134 and the emitter 124E of the switching element. The coil 132 as an element is large in size compared to semiconductor elements such as the main switching element 124 and the diode 134. One end of the diode 134 is connected to the coil 132 and the emitter 124E of the main switching element 124, and the other end to the first and second output circuits 40 and 50. The forward direction is the direction in which the diode 134 is directed from one end toward the other end. In the rectification circuit 130, when the main switching element 124 turns on, the electric current from the DC power supply flows through the main switching element 124 via coil 132, and at the same the time the electricity is reserved in the coil 132. On the other hand, when the main switching element 124 turns off, the electric current from the DC power supply flows through the first or second output circuit 40 or 50 via the coil 132 and the diode 134. Since the diode 134 is connected in such a manner that the direction in which the electric current flows when the coil 132 discharges the reserved electricity is the forward direction, even the reserved electricity of the coil 132 is discharged to the first or second output circuit 40 or 50, via the diode 134.

The first output circuit 40 includes the first sub-switching element 42 and a first capacitor 44. In the first sub-switching element 42, the emitter 42E is connected to the diode 134 of the rectification circuit 130.

The second output circuit 50 includes a second sub-switching element 52 and a second capacitor 54. In the second sub-switching element 52, the emitter 52E is connected to the diode 134 of the rectification circuit 130.

The control circuit 60 is configured as an ASIC (Application Specific Integrated Circuit) that controls the switching of the main switching element 124, and the first and second sub-switching elements 42 and 52. The control circuit 60 is connected to the base 124B of the main switching element 124, the base 42B of the first sub-switching element 42, and the base 52B of the second sub-switching element 52, and outputs a control signal to each of the bases 124B, 42B, and 52B. Furthermore, the control circuit 60 is connected to a connecting point between the first sub-switching element 42 and the first capacitor 44, and detects the voltage of this connecting point as the voltage V3 of the first output terminal 21. Also, the control circuit 60 is connected to a connecting point between the second sub-switching element 52 and the second capacitor 54, and detects a voltage of this connecting point as the voltage V4 of the second output terminal 22. The control circuit 60 outputs the control signal to the main switching element 124 and turns on and off the main switching element 124 in a repetitive manner. Thus, the electric current flows through the rectification circuit 130, depending on whether the main switching element 124 turns on or off. The control circuit 60 controls the turning on and off of the first and second sub-switching elements 42 and 52, and thus the switching is performed which determines through which of the first and second output circuits 40 and 50 the electric current from the rectification circuit 130 flows. As a result, the control circuit 60 has a function of enabling the first output terminal 21 to output the voltage that is the result of transforming the voltage from the DC power supply in response to the electric current flowing through the first output circuit 40, and of enabling the second output terminal 22 to output the voltage that is the result of transforming the voltage from the DC power supply in response to the electric current flowing through the second output circuit 50. Furthermore, the control circuit 60 has a function of performing the feedback control to adjust the voltage V3 of the first output terminal 21 and the voltage V4 of the second output terminal 22, in such a manner that the detected voltage V3 of the first output terminal 21 comes within a third voltage range (for example, a range of 30V±5%) that is set as a target value, and the detected voltage V4 of the second output terminal 22 comes within a fourth voltage range (for example, a range of 25V±5%) that is set as a target value.

Figure 6:
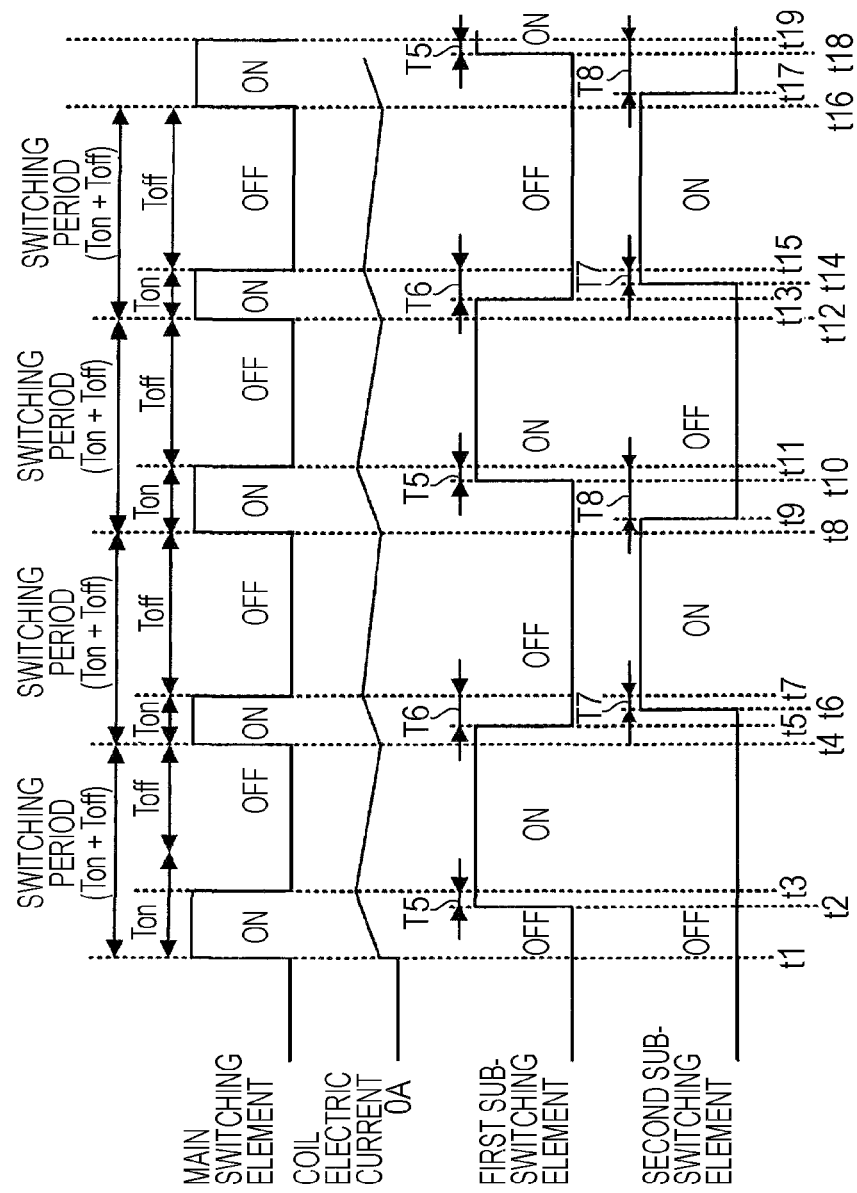
FIG. 6 is a timing chart illustrating an operation state of the switching device.
Figure 7A:
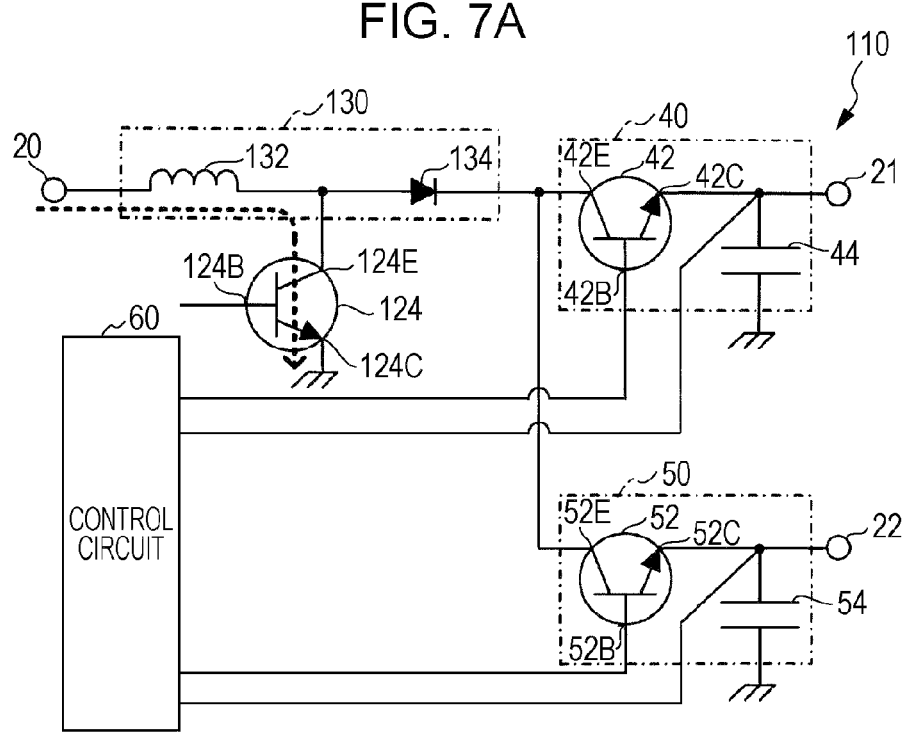
Figure 7B:
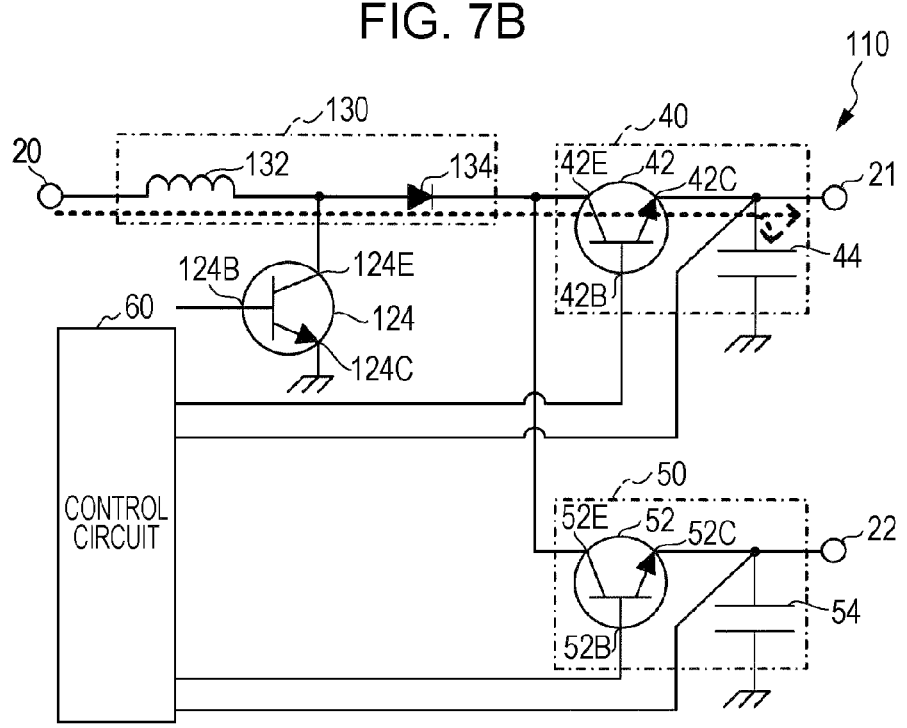
Figure 8:
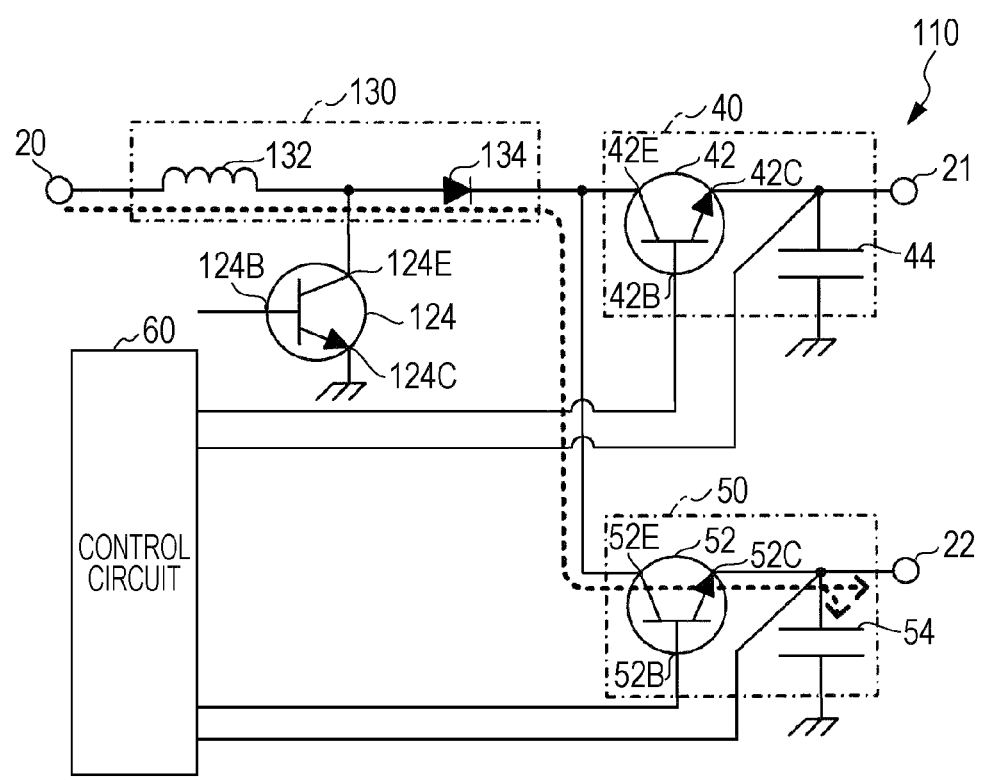

Next, the operation of the switching device 110 with this configuration according to the second embodiment is described. FIG. 6 is a timing chart illustrating an operation state of the switching device 110. FIGS. 7A and 7B are explanatory views illustrating an operation state in which the first sub-switching element 42 turns on. FIG. 7A is an explanatory view illustrating an operation state in which both of the main switching element 124 and first sub-switching element 42 turn on. FIG. 7B is an explanatory view illustrating an operation state in which the main switching element 124 turns off, and the first sub-switching element 42 turn on. FIG. 8 is an explanatory view illustrating an operation state in which the main switching element 124 turns off and the second sub-switching element 52 turns on. As is the case with the first embodiment, the control circuit 60 outputs a pulse signal with a given frequency f (for example, 100 kHz) to the base 124B, and thus turns on and off the main switching element 124, in a repetitive manner. Furthermore, the period from the time when the main switching element 124 is switched from the off-state to the on-state to the next time when the main switching element 124 is switched from the off-state to the on-state is defined as a switching period. The initial switching period (the period from time t1 to time t4 in FIG. 6) corresponds to the first output circuit 40, and a second switching period (the period from time t4 to time t8 in FIG. 6) corresponds to the second output circuit 50. Each of subsequent switching periods corresponds to the first and second output circuits 40 and 50, in an alternating manner.

Next, the specific operation state of the switching device 110 according to a time series in FIG. 6 is described. First, the main switching element 124, and the first and second sub-switching elements 42 and 52 are all in the off-state, but the control circuit 60 turns on the main switching element 124 at time t1. Because of this, as shown in FIG. 7A, the electric current from the DC power supply flows through the reference potential, via the input terminal 20 and the main switching element 124. At this point, since the coil 132 reserves the electric energy, the amount of electric current gradually increases which flows through the coil 132 from time t1, as shown in FIG. 6.

Next, the control circuit 60 turns on the first sub-switching element 42 of the first output circuit 40 at time t2 during the initial switching period that corresponds to the first output circuit 40. Furthermore, the control circuit 60 turns off the main switching element 124 at time t3 when on-time Ton elapses from time t1. For example, the control circuit 60 detects the voltage V3 of the first output terminal 21 in a specific timing before time t2. The control circuit 60 fixes the length of on-time Ton from time t1 to time t3, that is, the duty ratio, by the feedback control, so that the detected voltage V3 may come within a third voltage range. Furthermore, time t2 is earlier by time T5 (T5 is a positive value) only than time t3 when the main switching element 124 turns off. This time T5 is a value that is determined in advance, in such a manner that the switching of the first sub-switching element 42 from an on-state to an off-state is performed during the period of time when the electric current from the rectification circuit 130 does not flow into the first sub-switching element 42 although the first sub-switching element 42 turns on that is subject to the switching. During the period of time when the main switching element 124 turns on, since the emitter 124E is electrically connected to the reference potential, the electric current from rectification circuit 130 does not flow through the first output circuit 40 although the first sub-switching element 42 turns on. Therefore, since the first sub-switching element 42 turns on earlier by time T5 only than time t3 when the main switching element 124 turns off, the switching loss is prevented from occurring in the first sub-switching element 42. Time T5 may be determined, for example, by experiment, based on, for example, the time when the first sub-switching element 42 turns on, in such a manner that the first sub-switching element 42 is in the on-state before time t3.

When the first sub-switching element 42 turns on at time t2 and the main switching element 124 is in the off-state at time t3, the electric current from the DC power supply flows through the input terminal 20, the rectification circuit 130, the first output circuit 40, and the first output terminal 21, in this order, as shown in FIG. 7B. Furthermore, even electricity reserved by the coil 132 during the period from time t1 to time t3 is discharged to the first output circuit 40, via the diode 134, and thus the electric current flows through the first output terminal 21. Therefore, the voltage in response to this sum of electric current is output to the first output terminal 21. In addition, the electric current also flows into the first capacitor 44, resulting in electric charge being reserved. Therefore, since the coil 132 discharges the electric energy, the amount of electric current flowing through the coil 132 gradually decreases from time t3, as shown in FIG. 6.

Next, the control circuit 60 turns on the main switching element 124 at time t4 when off-time Toff elapses from time t3, and turns off the first sub-switching element 42 at time t5. Therefore, the control circuit 60 turns on the second sub-switching element 52 of the second output circuit 50 at time t6 during the next switching period (from time t4 to time t8) corresponding to the second output circuit 50, and turns off the main switching element 124 at time t7 when on-time Ton elapses from time t4. Since the main switching element 124 turns on at time t4, the switching device 110 is in the same state as shown in FIG. 7A during the period form time t4 to time t7, and the electric current from the rectification circuit 130 does not flow into the first and second output circuits 40 and 50. In this state, electric charge is discharged from the first capacitor 44, and thus the electric current flows through the first output terminal 21. The voltage in response to this electric current is output to the first output terminal 21.

At this point, time t5 is earlier than time t7 only by time T6 (T6 is a positive value) when the main switching element 124 turns off. Furthermore, time t6 is earlier than time t7 only by time T7 (T7 is a positive value) when the main switching element 124 turns off. Time T6 is a value that is determined in advance, in such a manner that the switching of the first sub-switching element 42 from the on-state to the off-state is performed during the period of time when the electric current from the rectification circuit 130 does not flow into the first sub-switching element 42 although the first sub-switching element 42 turns on that is subject to the switching. Time T7 is a value that is determined in advance, in such a manner that the switching of the second sub-switching element 52 from the off-state to the on-state is performed during the period of time when the electric current from the rectification circuit 130 does not flow into the second sub-switching element 52 although the second sub-switching element 52 turns on that is subject to the switching. As described above, the state is the same as shown in FIG. 7A, during the period of time when the main switching element 124 turns on. Although the first and second sub-switching elements 42 and 52 turn on, the electric current from the rectification circuit 130 does not flow into the first and second sub-switching elements 42 and 52. Therefore, the switching loss may be prevented from occurring in the first sub-switching element 42, because time T6 and time T7 are determined in such a manner that the switching of the first and second sub-switching elements 42 and 52 is performed during the period from time t4 when the main switching element 124 turns on to time t7 when the main switching element 124 turns off. In the second embodiment, since the third voltage range of the first output terminal 21 and the fourth voltage range of the second output terminal 22 are different from each other, time T6 is greater than time T7 as shown in FIG. 6. Thus, the first and second sub-switching elements 42 and 52 cannot turn on at the same time. Time T6 may be determined, for example, by experiment, based on, for example, the time when the first sub-switching element 42 turns off, in such a manner that the first sub-switching element 42 is in the on-state in the timing before time t6. Time T7 is the same value as time T5.

When the second sub-switching element 52 turns on at time t6 and the main switching element 124 turns off at time t7, the electric current from the DC power supply flows through the input terminal 20, the rectification circuit 130, the second output circuit 50, and the second output terminal 22, in this order, as shown in FIG. 8. Furthermore, even electricity reserved by the coil 132 during the period from time t4 to time t7 is discharged to the second output circuit 50 via the diode 134, and thus the electric current flows through the second output terminal 22. Therefore, the voltage in response to this sum of the electric current is output to the second output terminal 22. Furthermore, the electric current flows into even the second capacitor 54, resulting in electric charge being reserved. Therefore, since the coil 132 discharges the electric energy, the amount of electric current flowing through the coil 132 gradually decreases from time t7, as shown in FIG. 6.

Subsequently, the control circuit 60 turns on the main switching element 124 at time t8 when off-time Toff elapses from time t7 and turns off the second sub-switching element 52 at time t9. At this point, time t9 is earlier by time T8 (T8 is a positive value) only than time t11, the next time when the main switching element 124 turn off. Time T8 is a value that is determined in advance, in such a manner that the switching of the second sub-switching element 52 from the on-state to the off-state is performed during the period of time when the electric current from the rectification circuit 130 does not flow into the second sub-switching element 52 although the second sub-switching element 52 turns on that is subject to the switching. During the period from time t8 when the main switching element 124 turns on to time t11 when the main switching element 124 turns off, the electric current from the rectification circuit 130 does not flow into the second sub-switching element 52, as shown in FIG. 7A. Therefore, the switching loss may be prevented from occurring in the second sub-switching element 52, because time T8 is determined in such a manner that the switching of the first and second sub-switching elements 42 and 52 is performed during this period. Therefore, in the second embodiment, time T8 is greater than time T5 (time T8>time T5), for the same reason why time T6 is greater than time T7 (time T6>time T7). Furthermore, time T7 is the same value as time T5.

For the subsequent switching periods, the control circuit 60 performs the same operation as described above, according to the sub-switching element which corresponds to the switching period. For example, since the switching period from time t8 to time t12 corresponds to the first sub-switching element 42, the control circuit 60 controls the turning on and off of the main switching element 124, and the first and second sub-switching elements 42 and 52 during the period from time t8 to time t13 as it does during the period from time t1 to time t5. Furthermore, since the switching period from time t12 to time t16 corresponds to the second sub-switching element 52, the control circuit 60 controls the turning on and off of the main switching element 124, and the first and second sub-switching elements 42 and 52 during the period from time t12 to time t17 as it does during the period from time t4 to time t9.

Variation ranges of voltages V3 and V4 are now described. During the period from time t1 to time t3, since the electric current does not flow through the first output terminal 21, but flows through it after time t3, the voltage V3 in response to this occurs. Furthermore, since the electric current begins to flow at time t3, the voltage V3 in response to this increases, and since the electric energy from the coil 132 gradually decreases during the period from time t3 to time t4, the voltage V3 in response to this decreases. During the period from time t4 to time t11, since the electric current from electric charge that is discharged from the first capacitor 44 gradually decreases, the voltage V3 in response to this decreases to a greater degree. Since the electric current from the DC power supply and the coil 132 again flows through the first output terminal 21 at time t11, the voltage V3 in response to this increases, and the voltage V3 decreases during the period from time t11 to time t19 as during the period from time t3 to time t11. Since the electric current does not flow through the second output terminal 22 during the period from time t1 to time t7, and flows through the second output terminal 22 after time t7, the voltage V4 in response to this occurs. Since the electric current begins to flow at time t7, the voltage V4 in response to this increases, and since the electric energy from the coil 132 gradually decreases during the period from time t7 to time t8, the voltage V4 in response to this decreases. During the period from time t8 to time t15, since the electric current from electric charge that is discharged from the second capacitor 54 gradually decreases, the voltage V4 in response to this decreases to a greater degree. Therefore, since the electric current from the DC power supply and the coil 132 again flows through the second output terminal 22 at time t15, the voltage V4 in response to this increases, and the voltage V4 decreases during the period from time t15 to the next time when the main switching element 124 turns off during the switching period corresponding to the first output circuit 40, as during the period from the time t7 to time t15. In this way, the voltages V3 and V4 increases and decrease in a repetitive manner. The control circuit 60 performs the feedback control to adjust the duty ratio described above, and thus the variation ranges of the voltages V3 and V4 that increase and decrease in an alternating manner come within the third and fourth voltage ranges, respectively. For example, the control circuit 60 detects the voltage V3 of the first output terminal 21 in the specific timing before time t1. The control circuit 60 fixes the length of on-time Ton from time t1 to time t3, that is, the duty ratio, by the feedback control, so that the detected voltage V3 may come within the third voltage range. Furthermore, the control circuit 60 detects the voltage V4 of the second output terminal 22 in a specific timing before time t4. The control circuit 60 fixes the length of on-time Ton from time t4 to time t7, that is, the duty ratio, by the feedback control, so that the detected voltage V4 may come within the fourth voltage range.

In this way, in the switching device 110 according to the second embodiment, the control circuit 60 controls the main switching element 124, and the first and second sub-switching elements 42 and 52, and thus the voltages V3 and V4 that are output from the first and second output terminals 21 and 22, respectively, are made different in value from each other, with the coil 132 of the rectification circuit 130 being shared between the first and second output terminals 21 and 22.

In the switching device 110 according to the second embodiment, as described above, the electric current flows through the rectification circuit 130, depending on whether the main switching element 124 turns on or off, and thus the electric current from the rectification circuit 130 flows through either of the first and second sub-switching elements 42 and 52, whichever turns on. Therefore, by controlling the turning on and off of the first and second sub-switching elements 42 and 52, the switching is performed which determines through which of the first and second output circuits 40 and 50 the electric current from the rectification circuit flows. Thus, the voltage that is a result of transforming the voltage from the DC power supply in response to the electric current flowing through the first output circuit 40, is output from the first output terminal 21, and the voltage that is a result of transforming the voltage from the DC power supply in response to the electric current flowing through the second output circuit 50, is output from the second output terminal 22. As a result, since one rectification circuit 130 is shared, the number of coils may be smaller than the number of output terminals. The coil 132 as an element is large in size compared to a semiconductor elements such as the main switching element 124 and the diode 134, but is smaller in number than the output terminals. Therefore, the overall switching device 110 may be reduced in size.

Furthermore, in the switching device 110, at the time when the coil 132 is smaller in number than the output terminals, the control circuit 60 controls the turning on and off of the main switching element 124, and the first and second sub-switching elements 42 and 52, and thus the voltages output from the first and second output terminals 21 and 22 may be controlled.

Furthermore, the control circuit 60 performs the switching of the first and second sub switching elements 42 and 52 from the off-state to the on-state and the switching of the first and second sub switching elements 42 and 52 from the on-state to the off-state, during the specific period of time when electric current from the rectification circuit does not flow into the switching element although the sub switching element turns on that is subject to the switching. For this reason, when the switching of the first and second sub-switching elements 42 and 52 is performed, the switching loss may be prevented from occurring. Furthermore, the first and second sub-switching elements 42 and 52 may consume less electric power.

Furthermore, the control circuit 60 makes each switching period correspond to the first or second output circuit 40 or 50, every switching period from the time when the main switching element 124 is switched from the off-state to the on-state to the next time when the main switching element 124 is switched from the off-state to the on-state. Then, the control circuit 60 turns on only the sub-switching element of the first or second output circuit 40 or 50 corresponding to each switching period in the first and second sub-switching elements 42 and 44. As a result, the switching is performed in such a manner that the electric current from the rectification circuit 130 flows through the first or second output circuit 40 or 50 corresponding to each switching period. For this reason, the switching may be performed in a simple manner which determines through which of the first and second output circuits 40 and 50 the electric current from the rectification circuit 130 flows.

By controlling the duty ratio of the turning on and off of the main switching element 124 during the switching period, the control circuit 60 adjusts the electric current flowing through the first or second output circuit 40 or 50 corresponding to each switching period, and adjusts the voltage output from the first or second output terminal 21 or 22 connected to the first or second output circuit 40 or 50 corresponding to each switching period. For this reason, the voltages V3 and V4, which are output from the first and second output terminals 21 and 22, respectively, may be adjusted by performing a simple function of controlling the duty ratio of the turning on and off of the main switching element 124.

Furthermore, the control circuit 60 performs the feedback control to adjust the voltages V3 and V4 of the first and second output terminal 21 and 22, by controlling the duty ratio of the turning on and off of the main switching element 124, in such a manner that the detected voltage V3 of the first output terminal 21 comes within the specific third voltage range, and the detected voltage V4 of the second output terminal 22 comes within the specific fourth voltage range. For this reason, the voltages V3 and V4 of the first and second output terminals 21 and 22 may be adjusted in a more appropriate manner.

The correspondence is described between the elements of the first and second embodiments and those of the aspects of the invention. The main switching elements 24 and 124 of the first and second embodiments are equivalent to the main switching elements of the aspects of the invention. The coils 32 and 132 are equivalent to the coil of the aspects of the invention. The rectification circuits 30 and 130 are equivalent to the rectification circuit of the aspects of the invention. The first output terminal 21 is equivalent to the first output circuit of the aspects of the invention. The first output circuit 40 is equivalent to the first output circuit of the aspects of the invention. The first sub-switching element is equivalent to the first sub-switching element of the aspects of the invention. The second output terminal 22 is equivalent to the second output terminal of the aspects of the invention. The second output circuit 50 is equivalent to the second output circuit of the aspects of the invention. The second sub-switching element 52 is equivalent to the second sub-switching element of the aspects of the invention. For the first and second embodiments, the description of the operation of the switching devices 10 and 110 also discloses one example of a method of controlling a switching device according to the aspects of the invention.

The aspects of the invention are not limited to the first and second embodiments described above, and various embodiments are available for reduction to practice as long as they belong to the technical scope of the aspects of the invention.

For example, in the first and second embodiments described above, the main switching elements 24 and 124, the first sub-switching element 42, and the second sub-switching element 52 are all described as an NPN transistor, but the main switching element may be any type capable of switching electricity that is input from the DC power supply, the first sub-switching element 42 may be any type capable of performing switching between the rectification circuit 30 or 130 and the first output terminal 21, and the second sub-switching element 52 may be any type capable of switching between the rectification circuit 30 or 130 and the second output terminal 22. For example, one or more of the main switching elements 24 and 124, and the first and second sub-switching elements 42 and 52 may be a PNP transistor. In this case, in the first and second embodiments described above, a collector of the PNP transistor may be connected instead of the emitter of the NPN transistor, and an emitter of the PNP transistor may be connected instead of the collector of the NPN transistor, and a base of the PNP transistor may be connected in the same manner as the base of the NPN transistor. Furthermore, one or more of the main switching elements 24 and 124, and the first and second sub switching element 42 and 52 may be an N-channel MOSFET. In this case, in the first and second embodiments described above, a gate of the N-channel MOSFET may be connected instead of the base of the NPN transistor, and a source of the N-channel MOSFET may be connected instead of the emitter of the NPN transistor, and a drain of the N-channel MOSFET may be connected instead of the collector of the NPN transistor. Furthermore, one or more of the main switching elements 24 and 124, and the first and second sub-switching elements 42 and 52 may be a P-channel MOSFET. In this case, in the embodiments described above, a gate of the P-channel MOS-FET may be connected instead of the base of the NPN transistor, a drain of the P-channel MOS-FET may be connected instead of the emitter of the NPN transistor, and the gate of the P-channel MOS-FET may be connected instead of the collector of the NPN transistor.

In the embodiments described above, the rectification circuits 30 and 130 are shown as the circuits in FIGS. 1 and 5, but they are not limited to these configurations as long as they are connected to the main switching element and has the coil.

In the embodiments described above, the first output circuit 40 is shown as the circuit in FIGS. 1 and 5, but it is not limited to this configuration as long as it has the first sub-switching element that performs the switching between the rectification circuit and the first output terminal, with one end of the first sub-switching element being connected to the rectification circuit and the other end to the first output terminal. Likewise, the second output circuit 50 is shown as the circuit in FIGS. 1 and 5, but it is not limited to this configuration as long as it has the second sub-switching element that performs the switching between the rectification circuit and the second output terminal, with one end of the second sub-switching element being connected to the rectification circuit and the other end to the second output terminal.

In the first and second embodiments described above, the control circuit 60 performs the feedback control, but the control circuit may not perform this feedback control. Furthermore, the control circuit 60 performs control to adjust the duty ratio, but the duty ratio may be predetermined as a fixed value, without having to adjust the duty ratio.

In the first and second embodiments described above, time T1 and time T3 are the same value, but they are not limited to the same value and may be different values. This is true for time T2 and time T4, time T5 and time T7, and time T6 and time T8. Furthermore, at least one of time T1 to time T8 may be made a value zero (0). In this manner, when the sub-switching element that is subject to the switching turns on, the switching of the sub-switching element may be performed during the period of time when the electric current from the rectification circuit flows into the sub-switching element. Each of time T1 to time T8 may be a variable value. For example, each of time T1 to time T8 may be a variable value in response to the voltage of the first output terminal 21 and the voltage of the second output terminal 22.

In the first and second embodiments described above, each of the switching devices 10 and 110 includes the control circuit 60, but it may not include the control circuit 60. In this case, for example, each of the switching devices 10 and 110 may be connected to a different kind of control circuit.

In the first and second embodiment described above, each of the switching devices 10 and 110 includes two output terminals, but it may include three or more of the output terminals. For example, in the case of including a third output terminal, each of the switching devices 10 and 110, may further include a third output circuit including a third sub-switching element of which one end is connected to the rectification circuits 30 and 130, and the other end to the third output terminal, with the rectification circuits 30 and 130 being shared. The third output circuit has the same configuration as the first output circuit 40.

Figure 9:
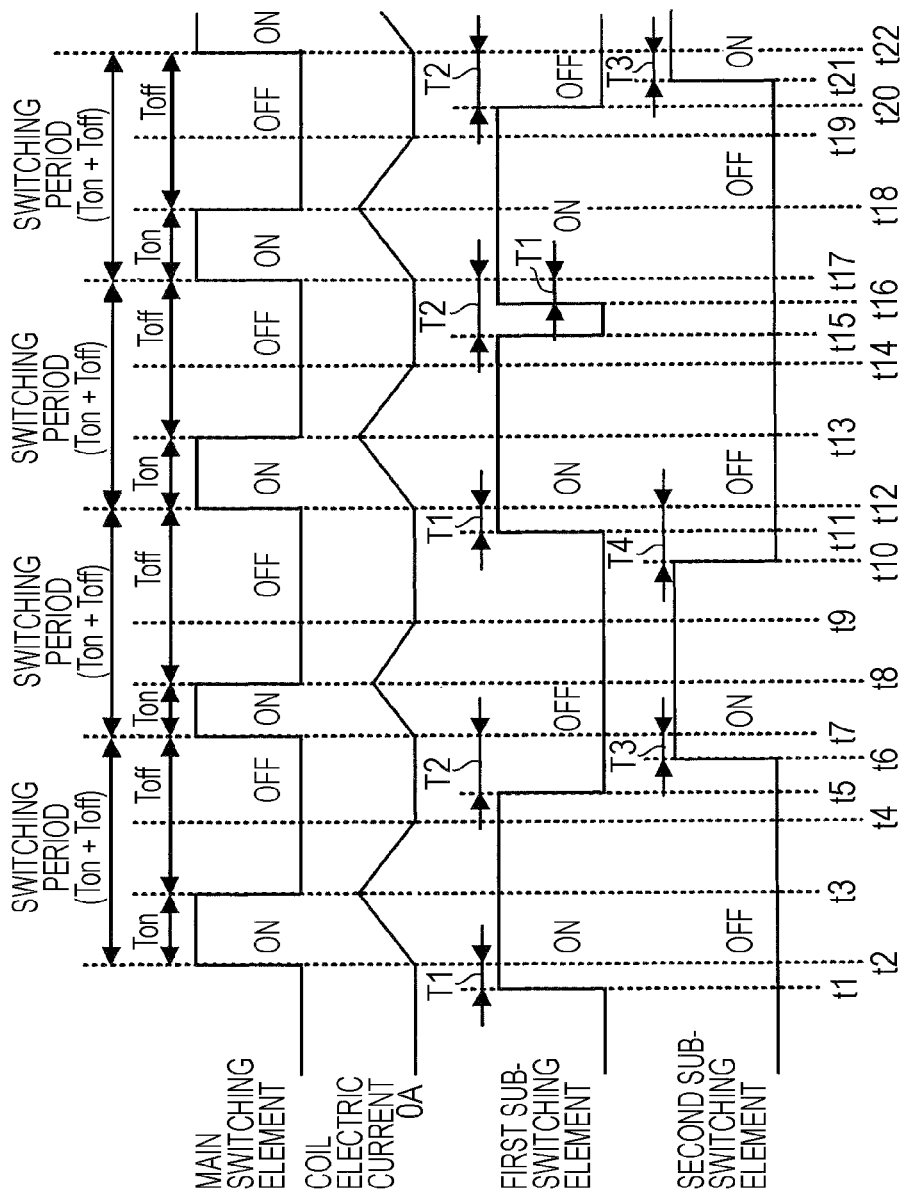
FIG. 9 is a timing chart illustrating the performing of control to change the frequency of switching periods.

In the first and second embodiments described above, each switching period corresponds to the first and second output circuits 40 and 50, in an alternating manner, but correspondence between the switching period and the output circuits 40 and 50 is not limited to this alternating manner. For example, the switching period may correspond to the first output circuit 40 two times consecutively, and then the following switching period may correspond to the second output circuit 50 one time. Similarly, the correspondence between the switching period and the first or second output circuit 40 or 50 may be determined in a suitable manner. Furthermore, by changing the frequency of the switching period corresponding to the first output circuit 40, the control circuit 60 may adjust the electric current flowing through the first output circuit 40 and thus may adjust the voltage output from the first output terminal 21. Also, by changing the frequency of the switching period corresponding to the second output circuit 50, the control circuit 60 may adjust the electric current flowing through the second output circuit 50 and thus may adjust the voltage output from the second output terminal 22. For example, when the voltage V1 comes within the specific low voltage range, the control circuit 60 may increase the frequency of the switching period corresponding to the first output circuit 40 connected to the first output terminal 21. Also, when the voltage V1 comes within the specific high voltage range, the control circuit 60 may increase the frequency of the switching period corresponding to the first output circuit 40. FIG. 9 is a timing chart illustrating an operation state of the switching device 10 when the control circuit performs control to increase the frequency of the switching period of the first output circuit. As shown in FIG. 9, time t1 to time t15 are the same as in FIG. 2, and each switching period corresponds to the first and second output circuits 40 and 50, in an alternating manner. Therefore, the control circuit 60 increases the frequency of the switching period of the first output circuit 40, for example, when it determines that the voltage V1 detected in the specific timing before time t12 comes within the low voltage range. More specifically, the next switching period (from time T12 to time t17) and the next switching period thereafter (time t17 to time t22) are made to correspond to the first output circuit 40 consecutively, and the next switching period thereafter (starting from time t22) is made to correspond to the second output circuit 50. Because of this, the switching period from time t17 to time t22 is present in the first output circuit 40 instead of in the second output circuit 50, and thus, the first sub-switching element 42 turns on at time t16 that is earlier than time t17 by time T1 only, and the first sub-switching element 42 turns off at time t20 that is earlier than time t22 by time T2 only, in a different manner from that in FIG. 2. Therefore, since the switching period starting from time T22 corresponds to the second output circuit 50, the second sub-switching element 52 turns on at time t21 that is earlier than time t22 by time T3 only. When this is done, since the first sub-switching element 42 turns on two times consecutively over two switching periods, a large amount of electric current may flow through the first output terminal 21, compared to the case where the switching period corresponds to the first and second output circuits 40 and 50 in an alternating manner, and thus the voltage V1 of the first output terminal 21 may become a greater value. In this way, when the detected voltage of the output terminal comes within the specific low voltage range, even the performing of the feedback control that increase the frequency of the switching period corresponding to the output circuit connected to that output terminal may adjust the voltage of the output terminal. In this way, the simple changing in the frequency of the switching period corresponding to the output circuit may adjust the voltage output from the output terminal. Likewise, by decreasing the frequency of the switching period corresponding to the output circuit connected to the output terminal when the detected voltage of the output terminal comes within the specific high voltage range, the feedback control may be performed in such a manner that the voltage of the output terminal comes within the specific voltage range. Furthermore, in FIG. 9, the first sub-switching element 42 turns off at time t15 and turns on at t16, but without doing this, it may continue to turn on even during the period from time t15 to time t17. That is, when the switching period corresponds to the same output circuit consecutively, the switching of the sub-switching element from the on-state to the off-state and the subsequent switching of the sub-switching element from the off-state to the on-state may be omitted in between the subsequent switching periods. Furthermore, the voltage of the output terminal may be adjusted by either of the feedback control of the duty ratio and the feedback control of the frequency of the switching period. For example, in a normal situation, the voltage of the output terminal is controlled to adjust the duty ratio, and when the voltage of the output terminal remains within the specific low voltage range although the duty ratio is an upper limit value (for example, 50%), the frequency of the switching period of the output circuit connected to that output terminal may be increased. Also, when the voltage of the output terminal remains within the specific high voltage range although the duty ratio is a lower limit value (for example, 10%), the frequency of the switching period of the output circuit connected to that output terminal may be decreased. Furthermore, when the frequency of the switching period corresponding to the first output circuit 40 is increased, the frequency of the switching period of the second output circuit 50 is decreased by the same amount, and thus the voltage V2 of the second output terminal 21 is decreased. For this reason, the voltage V2 may be prevented from being decreased by increasing the duty ratio by the same amount during the switching period of the second output circuit 50 when the frequency of the switching period of the first output circuit 40 is increased.

In the first and second embodiments described above, the switching period corresponds to the first and second output circuits 40 and 50 in an alternating manner, but the switching period may not correspond to either of the first and second output circuits 40 and 50. In this case, during the switching period that does not correspond to either of the first and second output circuits 40 and 50, either of the first and second sub-switching elements 42 and 52 may turn off. Furthermore, for example, when the load connected to the first output terminal 21 is in rest mode, and the output of the voltage V1 is unnecessary, the switching period skips corresponding to the second output circuit 50 and the following switching period resumes corresponding to the second output circuit 50 (that is, subsequent switching periods correspond to the second output circuit 50 in an alternating manner), and in this skipping mode, such a switching period may not correspond to either of the first and second output circuits 40 and 50. That is, when the output terminal does not need to output the voltage, the switching period corresponding the output circuit connected to that output terminal may not correspond to either of the output circuits.

In the first and second embodiments described above, the switching devices 10 and 110 are configured as a DC-DC converter that receives the input of a DC voltage and outputs the DC voltage in the transformed form, in an electronic apparatus such as a multi-function device and a printer, but they may be configured as a DC-DC converter in an electronic apparatus without being limited to a multi-function device and a printer.

What is claimed is:

1. A switching device comprising:
   a main switching element capable of switching a voltage input from a DC power supply;
   a rectification circuit with a coil, connected to the main switching element;
   a first output circuit including a first sub-switching element performing switching between the rectification circuit and a first output terminal, with one end of the first output circuit being connected to the rectification circuit and the other end to the first output terminal; and
   a second output circuit including a second sub-switching element performing switching between the rectification circuit and a second output terminal, with one end of the second output circuit being connected to the rectification circuit and the other end to the second output terminal.

2. The switching device according to claim 1, further comprising a control circuit that enables electric current to flow through the rectification circuit, depending on whether the main switching element turns on or off, by outputting a control signal to the main switching element and thus repeating the turning on and off of the main switching element, and performs the switching that determines through which of the first and second output circuits the electric current from the rectification circuit flows, in order to enable the first output terminal to output a voltage that is a result of transforming the voltage from the DC power supply in response to the electric current flowing through the first output circuit and in order to enable the second output terminal to output a voltage that is a result of transforming a voltage from the DC power supply in response to the electric current flowing through the second output circuit, by controlling the turning on and off of the first and second sub-switching elements.

3. The switching device according to claim 2, wherein the control circuit performs the switching of the first or second sub-switching element from an off-state to an on-state during a specific period of time when the electric current from the rectification circuit does not flow into the corresponding sub-switching element although the sub-switching element turns on that is subject to the switching.

4. The switching device according to claim 2, wherein the control circuit performs the switching of the first or second sub-switching element from the on-state to the off-state during a specific period of time when the electric current from the rectification circuit does not flow into the corresponding sub-switching element although the sub-switching element turns on that is subject to the switching.

5. The switching device according to claim 2, wherein the control circuit makes each switching period correspond to the first or second output circuit, every switching period from the time when the main switching element is switched from the off-state to the on-state to the next time when the main switching element is switched from the off-state to the on-state, and turns on only the sub-switching element of the output circuit corresponding to each switching period in the first and second sub-switching elements, thereby performing the switching in such a manner that the electric current from the rectification circuit flows through the output circuit corresponding to each switching period.

6. The switching device according to claim 5, wherein the control circuit adjusts the electric current flowing through the output circuit corresponding to each switching period, and thus adjusts the voltage output from the output terminal connected to the output circuit corresponding to each switching period, by controlling a duty ratio of the turning on and off of the main switching element during the switching period.

7. The switching device according to claim 6, wherein the control circuit performs feedback control to adjust the voltages of the first and second output terminals, in such a manner that the detected voltage of the first output terminal comes within a specific first voltage range, and the detected voltage of the second output terminal comes within a specific second voltage range.

8. The switching device according to claim 5, wherein the control circuit adjusts the electric current flowing through the first output circuit, and thus adjusts the voltage output from the first output terminal, by changing the frequency of the switching period corresponding to the first output circuit, and adjusts the electric current flowing through the second output circuit, and thus adjusts the voltage output from the second output terminal, by changing the frequency of the switching period corresponding to the second output circuit.

9. The switching device according to claim 1, wherein the first sub-switching element is an NPN transistor in which a base is connected to the control circuit, an emitter to the rectification circuit, and a collector to the first output terminal, or is an N-channel MOSFET in which a gate is connected to the control circuit, a drain to the rectification circuit, and a source to the first output terminal, and the second sub-switching element is an NPN transistor in which a base is connected to the control circuit, an emitter to the rectification circuit and a collector to the second output terminal, or is an N-channel MOSFET in which a gate is connected to the control circuit, a drain to the rectification circuit and a source to the second output terminal.

10. The switching device according to claim 1,
wherein one end of the main switching element is connected to the DC power supply and the other end is connected to the rectification circuit,
wherein the rectification circuit includes:
a coil of which one end is connected to the main switching element and of which the other end is connected to the first and second output circuits; and
a diode of which one end is connected to the main switching element and the coil and of which the other end is reference potential, with a forward direction being a direction in which the diode is directed from the other end toward the one end, and
wherein the first and second output terminals output a voltage that is a result of stepping down the voltage from the DC power supply.

11. The switching device according to claim 10, wherein the main switching element is an NPN transistor in which a base is connected to the control circuit, an emitter to the DC power supply, and a collector to the rectification circuit, or is an N-channel MOSFET in which a gate is connected to the control circuit, a drain to the DC power supply, and a source to the rectification circuit.

12. The switching device according to claim 1,
wherein the rectification circuit comprises:
a coil of which one end is connected to the DC power supply and of which the other end is connected to the diode and the main switching element; and
a diode of which one end is connected to the coil and the main switching element and of which the other end is connected to the first and second output circuits, with a forward direction being a direction in which the diode is directed from the one end toward the other end;
wherein one end of the main switching element is connected to the coil and the diode and the other end is reference potential; and
wherein each of the first and second output terminals outputs a voltage that is a result of stepping up the voltage from the DC power supply.

13. The switching device according to claim 12, wherein the main switching element is an NPN transistor in which a base is connected to the control circuit, an emitter to the rectification circuit, and a collector is the reference potential, or is an N-channel MOSFET in which a gate is connected to the control circuit, a drain to the rectification circuit, and a source is the reference potential.

14. A method of controlling a switching device, the switching device comprising:
a main switching element capable of switching a voltage input from a DC power supply;
a rectification circuit with a coil connected to the main switching element;
a first output circuit including a first sub-switching element performing switching between the rectification circuit and a first output terminal, with one end of the first output circuit being connected to the rectification circuit and the other end to the first output terminal; and
a second output circuit including a second sub-switching element performing switching between the rectification circuit and a second output terminal, with one end of the second output circuit being connected to the rectification circuit and the other end to the second output terminal, the method comprising:
enabling electric current to flow through the rectification circuit, depending on whether the main switching element turns on or off, by outputting a control signal to the main switching element and thus repeating the turning on and off of the main switching element; and
performing the switching that determines through which of the first and second output circuits the electric current from the rectification circuit flows, in order to enable the first output terminal to output a voltage that is a result of transforming the voltage from the DC power supply in response to the electric current flowing through the first output circuit and in order to enable the second output terminal to output a voltage that is a result of transforming a voltage from the DC power supply in response to the electric current flowing through the second output circuit, by controlling the turning on and off of the first and second sub-switching elements.

* * * * *